US010690591B2

(12) United States Patent
Chen et al.

(10) Patent No.: US 10,690,591 B2
(45) Date of Patent: Jun. 23, 2020

(54) MEASUREMENT TIME DISTRIBUTION IN REFERENCING SCHEMES

(71) Applicant: Apple Inc., Cupertino, CA (US)

(72) Inventors: Robert Chen, Mountain View, CA (US); Trent D. Ridder, Sunnyvale, CA (US); Miikka M. Kangas, Sunnyvale, CA (US); David I. Simon, San Francisco, CA (US); Matthew A. Terrel, Campbell, CA (US)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 15/751,454

(22) PCT Filed: Aug. 29, 2016

(86) PCT No.: PCT/US2016/049326
§ 371 (c)(1),
(2) Date: Feb. 8, 2018

(87) PCT Pub. No.: WO2017/048497
PCT Pub. Date: Mar. 23, 2017

(65) Prior Publication Data
US 2018/0231457 A1 Aug. 16, 2018

Related U.S. Application Data

(60) Provisional application No. 62/220,887, filed on Sep. 18, 2015.

(51) Int. Cl.
G01N 21/27 (2006.01)
G01N 21/31 (2006.01)

(52) U.S. Cl.
CPC ........... G01N 21/274 (2013.01); G01N 21/31 (2013.01); G01N 2201/124 (2013.01); G01N 2201/12723 (2013.01); G01N 2201/12776 (2013.01)

(58) Field of Classification Search
CPC ............... G01N 21/274; G01N 21/31; G01N 2201/124; G01N 2201/12723; G01N 2201/12776
See application file for complete search history.

(56) References Cited

U.S. PATENT DOCUMENTS 3,805,074 A    4/1974  McCormack
3,818,223 A    6/1974  Gibson et al.
(Continued)

FOREIGN PATENT DOCUMENTS

CN    101783306    7/2010
CN    102084240    6/2011
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

Primary Examiner — Jamil Ahmed
(74) Attorney, Agent, or Firm — Brownstein Hyatt Farber Schreck, LLP

(57) ABSTRACT

Methods and systems for measurement time distribution for referencing schemes are disclosed. The disclosed methods and systems can be capable of dynamically changing the measurement time distribution based on the sample signal, reference signal, noise levels, and SNR. The methods and systems can be configured with a plurality of measurement states, including a sample measurement state, reference measurement state, and dark measurement state. In some examples, the measurement time distribution scheme can be based on the operating wavelength, the measurement location at the sampling interface, and/or targeted SNR. Examples of the disclosure further include systems and methods for measuring the different measurement states
(Continued)

concurrently. Moreover, the systems and methods can include a high-frequency detector to eliminate or reduce decorrelated noise fluctuations that can lower the SNR.

20 Claims, 18 Drawing Sheets

(56) References Cited

U.S. PATENT DOCUMENTS

| | | | |
|---|---|---|---|
| 4,262,205 A * | 4/1981 | Abu-Shumays | G01N 21/645 250/458.1 |
| 4,422,766 A | 12/1983 | Skukalek | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,283,243 B2 | 10/2007 | Langford et al. | |
| 7,663,607 B2 | 2/2010 | Hotelling et al. | |
| 8,479,122 B2 | 7/2013 | Hotelling et al. | |
| 2004/0069928 A1 | 4/2004 | Sagatelyan et al. | |
| 2006/0197753 A1 | 9/2006 | Hotelling | |

FOREIGN PATENT DOCUMENTS

| | | |
|---|---|---|
| CN | 102326069 | 1/2012 |
| CN | 103163639 | 6/2013 |
| CN | 104122221 | 10/2014 |
| JP | 2000-163031 A | 6/2000 |
| JP | 2002-342033 A | 11/2002 |
| KR | 20050003353 | 1/2005 |
| KR | 1020050003353 | 1/2005 |
| KR | 20060086843 | 8/2006 |
| WO | WO 03/087787 | 10/2003 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

MEASUREMENT TIME DISTRIBUTION IN REFERENCING SCHEMES

CROSS-REFERENCE TO RELATED APPLICATIONS

This application claims priority to U.S. Provisional Patent Application Ser. No. 62/220,887, filed Sep. 18, 2015, which is hereby incorporated by reference in its entirety.

FIELD

This relates generally to methods and systems for improving signal-to-noise ratio for referencing schemes, and more particularly, methods and systems for dynamically changing the measurement time distribution and removing high-frequency noise.

BACKGROUND

Absorption spectroscopy is an analytical technique that can be used to determine the concentration and type of one or more substances in a sample at a sampling interface. Conventional systems and methods for absorption spectroscopy can include emitting light at the sampling interface. As light is transmitted through the sample, a portion of the light energy can be absorbed at one or more wavelengths. This absorption can cause a change in the properties of the light exiting the sample. The properties of the light exiting at the sampling interface can be compared to the properties of the light exiting a reference, and the concentration and type of one or more substances in the sample at the sampling interface can be determined based on this comparison.

Although the comparison can determine the concentration and type of one or more substances in the sample at the sampling interface, the measurements can include a fixed measurement time distribution scheme. In some examples, the fixed measurement time distribution scheme can include an equal distribution of a cycle time to three measurement states: measuring the sample, measuring the reference, and measuring dark. However, the sample signal, reference signal, dark signal, and their corresponding noise levels can differ with operating wavelength, the surrounding environment, and/or measurement location of the substance in the sample. As a result, a fixed measurement time distribution scheme may not be optimal for all operating wavelengths and measurement locations in the sample. Additionally, the fixed measurement time distribution scheme can lead to long measurement times with unimportant information, erroneous measurement data, low signal-to-noise ratio (SNR), or a combination thereof. Thus, methods and systems for dynamically changing the measurement time distribution may be desired. Moreover, high-frequency noise in the system can lead to unacceptable SNR, so methods and systems for removing high-frequency noise may be desired.

SUMMARY

This relates to measurement time distribution for referencing schemes. The disclosed methods and systems can be capable of dynamically changing the measurement time distribution based on the sample signal, reference signal, noise levels, and SNR. The methods and systems can be configured with a plurality of measurement states, including a sample measurement state, reference measurement state, and dark measurement state. In some examples, less time can be allocated to the dark measurement state when the noise levels in the system are low. In some examples, the sample signal can be weak, and the system can allocate a greater amount of time to the sample measurement state than the other measurement states. In some examples, the sample signal can be strong, and the system can allocate a greater amount of time to the reference measurement state than the other measurement states. In some examples, the measurement time distribution scheme can be based on the operating wavelength, the measurement location in the sample, and/or targeted SNR. Examples of the disclosure further include systems and methods for measuring the different measurement states concurrently. Moreover, the systems and methods can include a high-frequency detector to eliminate or reduce decorrelated noise fluctuations that can lower the SNR.

DETAILED DESCRIPTION

Figure 1:
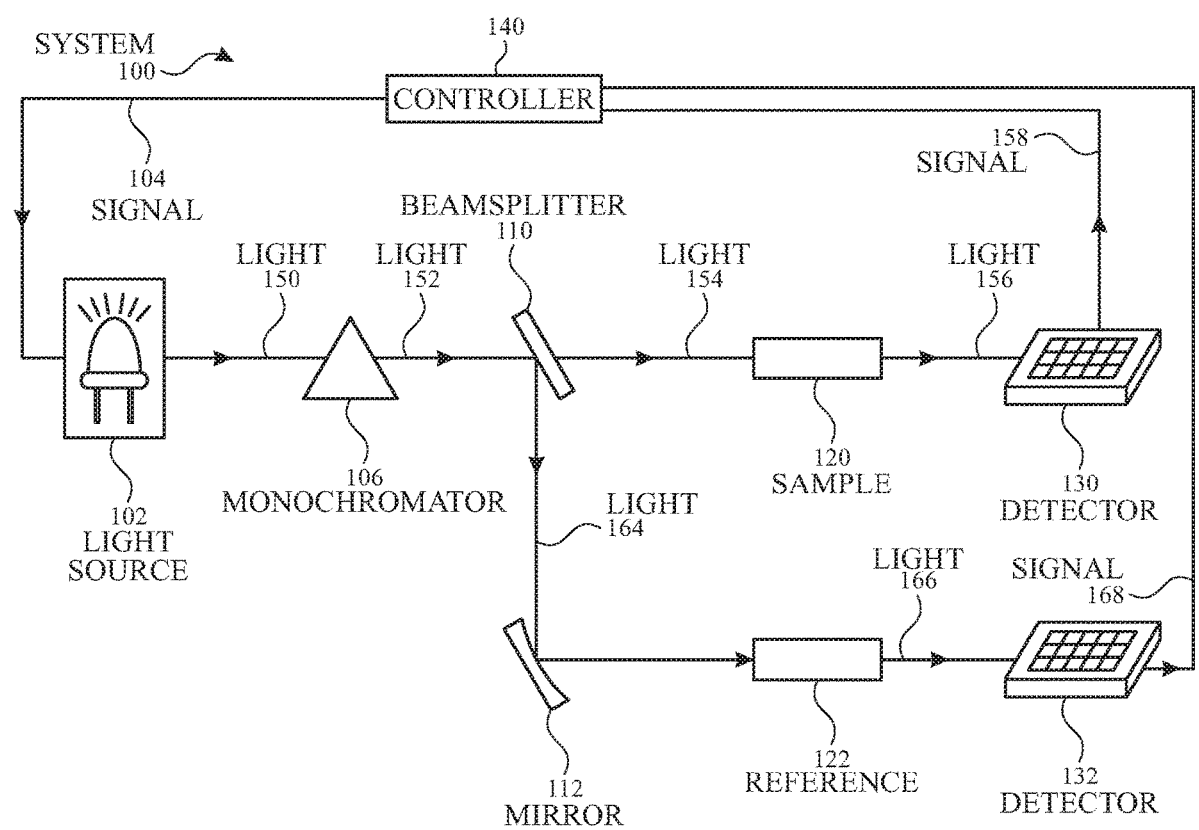
FIG. 1 illustrates an exemplary system comprising multiple detectors for measuring the concentration and type of one or more substances in a sample according to examples of the disclosure.

In the following description of examples, reference is made to the accompanying drawings in which it is shown by way of illustration specific examples that can be practiced. It is to be understood that other examples can be used and structural changes can be made without departing from the scope of the various examples.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well-known process steps and/or structures have not been described in detail in order to not obscure some of the aspects and/or features described or referenced herein.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

This disclosure relates to measurement time distribution for referencing schemes. The disclosed methods and systems can be capable of dynamically changing the measurement time distribution based on the sample signal, reference signal, dark signal, noise levels, SNR, or a combination thereof. The methods and systems can be configured with a plurality of measurement states, including a sample measurement state, reference measurement state, and dark measurement state. In some examples, less time can be allocated to the dark measurement state when the noise levels in the system are low. In some examples, the sample signal can be weak, and the system can allocate a greater amount of time to the sample measurement state than the other measurement states. In some examples, the sample signal can be strong, and the system can allocate a greater amount of time to the reference measurement state than the other measurement states. In some examples, the amount of time allocated to the sample measurement state and reference measurement state can be based on the noise level. In some examples, the noise level can depend on the intensity of the sample signal, reference signal, or both. In some examples, the measurement time distribution scheme can be based on the operating wavelength, the measurement location in the sample, the surrounding environmental conditions, and/or targeted SNR. Examples of the disclosure can further include systems and methods for measuring the different measurement states concurrently. Moreover, the systems and methods can include a high-frequency detector to eliminate or reduce time-decorrelated noise fluctuations that can lower SNR in particular referencing schemes.

For substances in a sample, each substance can have a signature in a certain wavelength regime, indicated by the pattern as a function of wavelength formed by one or more absorbance peaks. One exemplary wavelength regime can be short-wavelength infrared (SWIR). A substance can absorb higher amounts of energy at one or more wavelengths and can absorb lower amounts of energy at other wavelengths, forming a spectral fingerprint unique to the substance. Determination of the type of one or more substances in the sample can be performed by matching the measured spectrum to the contents of a spectral library including fingerprints of relevant substances. Additionally, the concentration of the substance can be based on the amount of absorption.

The sample can comprise multiple substances that can modify incident light. Of the multiple substances, one or more substances can be a substance of interest and other substances may not be of interest. In some examples, the substances not of interest can absorb more incident light than the substance of interest. Additionally, spectral artifacts can "mask" the absorbance peaks of the one or more substances of interest. Both the spectral artifacts and the absorption of substances not of interest can make detection of the substance of interest difficult. Furthermore, the concentration of the one or more substances can be distributed in an inhomogeneous manner in the sample, which can produce variations in the optical properties (e.g., linear birefringence, optical activity, diattenuation) of the sample.

Variations of the optical properties in the sample can lead to different signal values based on the measurement location in the sample. Additionally, the absorbance of the substances not of interest or the noise levels at different locations within the sample can differ. Furthermore, the components in the system can have differing drift with time, which can change the signal values and/or noise levels. Different signals values and/or different noise levels can lead to an SNR that varies based on several factors, such as wavelength, measurement location in the sample, or both.

Absorption spectroscopy is an analytical technique that can be used to determine the concentration and type of one or more substances in a sample. Light can have an initial intensity or energy when emitted from a light source and incident on a sample. As the light is transmitted through the sample, a portion of the energy can be absorbed at one or more wavelengths. This absorption can cause a change (e.g., loss) in the intensity of the light exiting the sample. As the concentration of the substance in the sample increases, a higher amount of energy can be absorbed, and this can be represented by the Beer-Lambert Law as:

$$A = \varepsilon l c = -\log_{10}(T) = -\log_{10}\left(\frac{I_{sample}}{I_{reference}}\right) \quad (1)$$

where $\varepsilon$ can be the absorptivity of the substance in the sample at the measurement wavelength, l can be the path length of light through the sample, c can be the concentration of the substance of interest, T can be the transmittance of the light exiting the sample, $I_{sample}$ can be the intensity along the sample path measured at the measurement wavelength, and $I_{reference}$ can be the intensity along the reference path measured at the measurement wavelength.

As shown in Equation 1, the amount of light exiting the sample can be an exponential function of concentration. Given the relationship between absorbance and transmittance measurement stated in Equation 1, a linear relationship can exist between absorbance and the concentration of the substance in the sample. In some examples, the concentration of a substance can be determined based on the absorbance measurement. In some examples, the reference path can include a reference "sample" with a known concentration of the one or more substances of interest. In some examples, the concentration of the substance in the sample can be calculated using a reference and a proportional equation, defined as:

$$\frac{A_{sample}}{A_{reference}} = \frac{C_{sample}}{C_{reference}} \quad (2)$$

where $A_{sample}$ and $A_{reference}$ are the sample absorbance and reference absorbance, respectively, and $C_{sample}$ and $C_{reference}$ are the concentrations of the substance in the sample and in the reference, respectively. In some examples, the substance can include one or more chemical constituents, and the measurement can be used to determine the concentration of each chemical constituent present in the sample.

Figure 2:
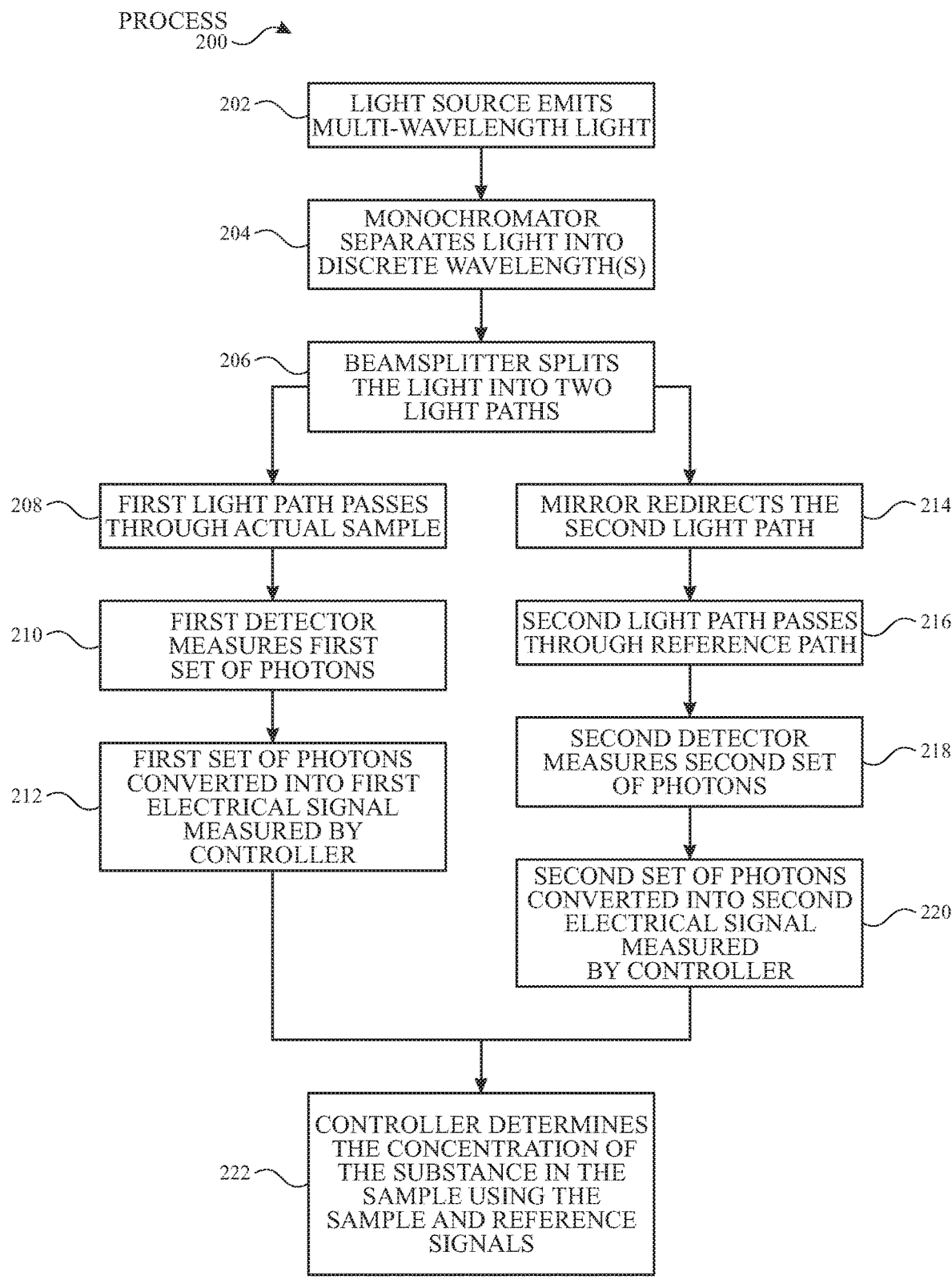
FIG. 2 illustrates an exemplary process flow for measuring the concentration and type of one or more substances in a sample using a system comprising multiple detectors according to examples of the disclosure.

FIG. 1 illustrates an exemplary system and FIG. 2 illustrates an exemplary process flow for measuring the concentration and type of one or more substances in a sample using a system comprising multiple detectors according to examples of the disclosure. System 100 can include light source 102 controlled by controller 140 through signal 104. Light source 102 can emit multi-band or multi-wavelength light 150 towards monochromator 106 (step 202 of process 200). A monochromator is a component that can select one or more discrete wavelengths from multi-wavelength light 150. In some examples, one or more discrete wavelengths can include a finite range of wavelengths. In some examples, monochromator 106 can comprise an entrance slit configured to select a spectral resolution and/or exclude unwanted or stray light. The monochromator can be coupled with one or more interference or absorption filters, prisms, or diffraction gratings for wavelength selection. Monochromator 106 can separate light 150 into one or more discrete wavelengths forming light 152 (step 204 of process 200). Light 152 can be incident on beamsplitter 110. A beamsplitter is an optical component that can split a beam of light into multiple beams of light. Beamsplitter 110 can split light 152 into two light beams: light 154 and light 164 (step 206 of process 200).

Light 154 can be incident on sample 120. A portion of light can be absorbed by the substance in sample 120, and a portion of light can be transmitted through sample 120 (step 208 of process 200). In some examples, a portion of the light can scatter. Scattering can lead to light loss and can alter the path length of the light transmitted through sample 120. The portion of light that is transmitted through sample 120 can be represented as light 156. Light 156 can comprise a set of photons that can impinge upon the active area of detector 130. Detector 130 can respond to or measure light or photons impinging on the active area (step 210 of process 200) and can generate electrical signal 158, which can be indicative of the properties of light 156 (step 212 of process 200). Electrical signal 158 can be input into controller 140.

Light 164 can be directed towards mirror 112 (step 214 of process 200). Mirror 112 can be any type of optics capable of directing or redirecting light towards reference 122. In some examples, the system can, additionally or alternatively, include, but is not limited to, non-reflective component(s) (e.g., curved waveguide) for light redirection. In some examples, system 100 can include other types of optics such as light guides, diffraction gratings, or a reflectance plate. Light 164 can be incident on reference 122. A portion of light 164 can be absorbed by the substance in reference 122, and a portion of light 164 can be transmitted through reference 122 as light 166 (step 216 of process 200). Light 166 can comprise a set of photons that can be incident on detector 132. In some examples, detector 130 and detector 132 can be matched detectors. That is, detector 130 and detector 132 can have similar characteristics including, but not limited to, the type of detector, operating conditions, responsivity, and performance. Detector 132 can respond to or measure light or photons impinging on the active area (step 218 of process 200) and can generate electrical signal 168 indicative of the properties of light 166 (step 220 of process 200). Electrical signal 168 can be input into controller 140.

Controller 140 can receive both signal 158 and signal 168. In some examples, signal 158 can include the sample signal, and signal 168 can include the reference signal. Controller 140 can divide, subtract, or scale the sample signal by the reference signal to obtain a ratio, for example. The ratio can be converted to absorbance by using Equation 1, and an algorithm can be applied to the absorbance spectrum to determine the concentration of the substance.

One advantage to determining the composition of the substance in the sample using system 100 (illustrated in FIG. 1) can be that fluctuations, drift, and/or variations originating from the light source, and not originating from changes in the composition of the substance, can be compensated.

For example, if the properties of light 152 emitted from light source 102 unexpectedly change, both light 154 and light 164 can be equally affected by this unexpected change. As a result, both light 156 and light 166 can also be equally affected such that the change in light can be canceled or ratioed out when controller 140 divides, scales, or subtracts signal 158 by signal 168. However, since system 100 includes two different detectors (e.g., detector 130 and detector 132) for absorbance measurements, fluctuations, drift, and/or variations originating from the detectors themselves may not be compensated. Although detector 130 and detector 132 can be matched (i.e., have the same characteristics), the rate or effect that various factors unrelated to the substance, such as environmental conditions, can have on the different detectors may not be the same. One skilled in the art would appreciate that the same characteristics can include tolerances that result in a 15% deviation. With differing effects to the different detectors, only one signal, and not both signals, can be perturbed. Instead of controller 140 realizing that there is a factor unrelated to the substance that has perturbed only one signal, controller 140 can erroneously calculate this perturbation as a difference in the concentration of sample 120 compared to the reference 122. Alternatively or additionally, controller 140 can mistake the type of substance if the perturbation leads to change in the spectral fingerprint.

There can be many sources of fluctuations, drift, and variations. One exemplary drift can be an initialization drift due to "warming up" the components. While the user can wait a certain time until such initialization drift has stabilized, this may not be a suitable solution in certain applications. For example, in systems where low power consumption is desired, certain components can be turned off when not in use to conserve power and then switched on when in use. Waiting for the components to warm up may become frustrating for the user depending on how long it would take for stabilization. Furthermore, the power consumed while waiting may negate the benefit of turning off the components.

Another exemplary drift can be due to noise. For example, 1/f noise can be present due to randomly changing non-ohmic contacts of the electrodes and/or influences from surface measurement state traps within a component. With random changes, not only are the changes unpredictable, but also may affect the different detectors in a different manner. Another exemplary drift can be thermal drift due to variations in temperature and/or humidity of the ambient environment, which may also affect the different detectors in a different manner.

Regardless of the source of the fluctuations, drift, and variations, the effect of having a detector measure the sample and a different detector measure the reference can lead to an unwanted change in the sensitivity, detectivity, and/or absorbance spectrum. Since the light path traveling through the sample can be different from the light path traveling through the reference and there can be many non-shared components or unmapped correlations between the two paths, any change in signal due to mismatch between the light paths may not be differentiated from a change in signal due to the substance of interest.

Since light source 102 in system 100 can be shared, drift and instabilities originating from light source 102 can be compensated for. However, drift or instabilities originating from components that are not shared (i.e., not common) along both light paths may not be compensated for. Moreover, the measurement capabilities of the system can be limited in situations where the detectors are shot noise limited. Shot noise is the noise or current generated from random generation and flow of mobile charge carriers. With shot noise limited detectors, the different detectors can have random and/or different noise floors. As a result, system 100 (illustrated in FIG. 1) may not be suitable for high sensitivity or low signal measurements.

Figure 3:
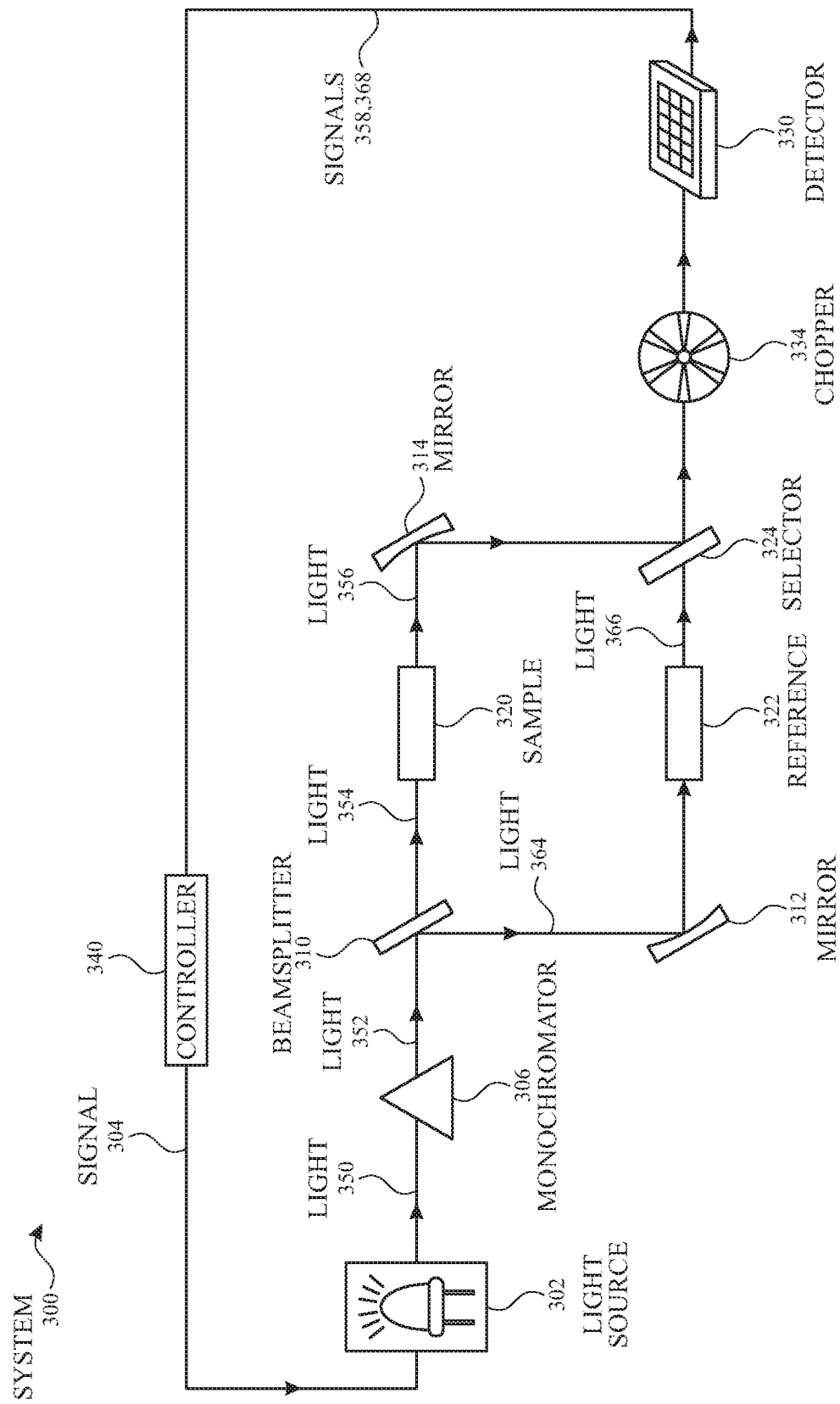
FIG. 3 illustrates an exemplary system comprising a shared detector for measuring the concentration and type of one or more substances in a sample according to examples of the disclosure.
Figure 4:
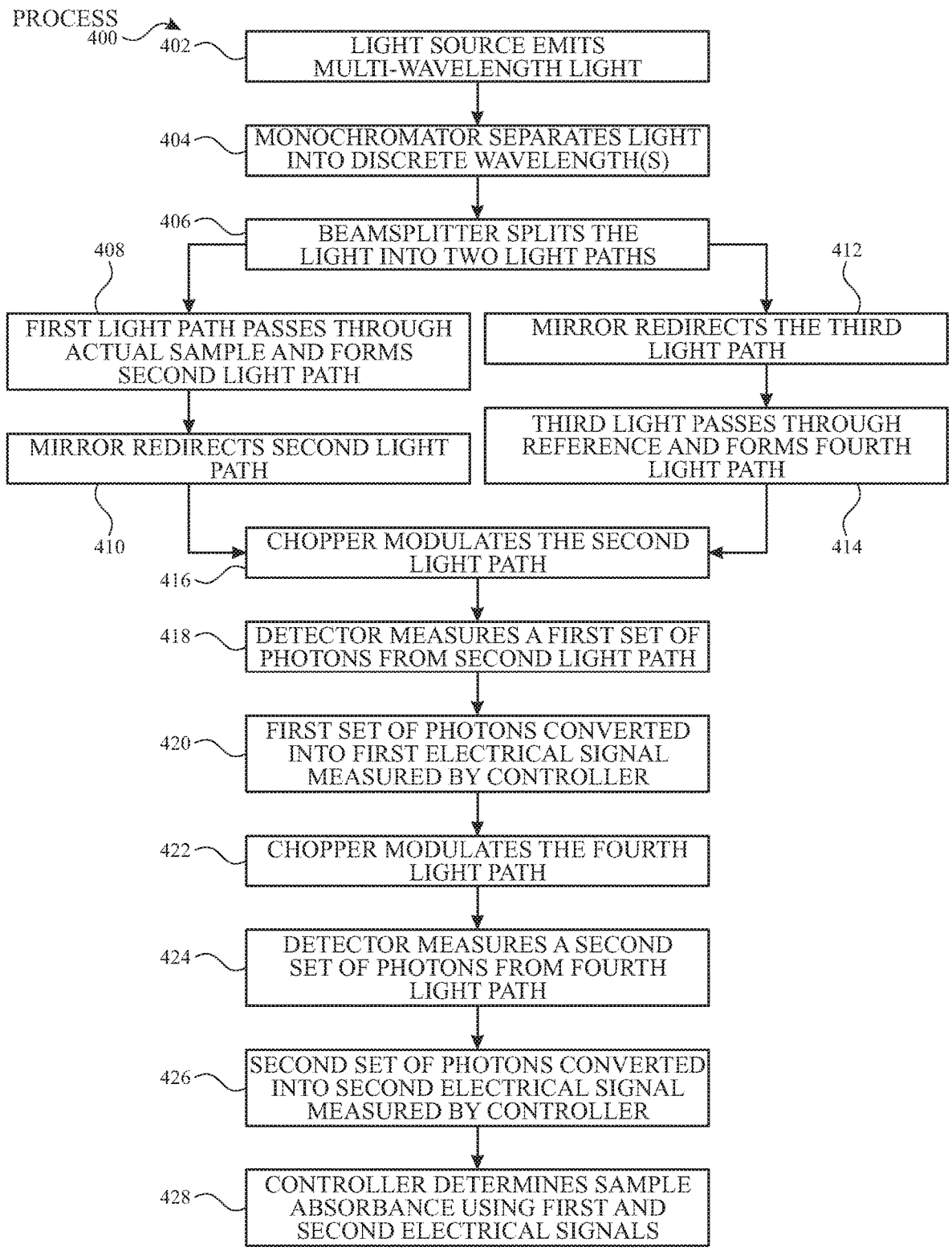
FIG. 4 illustrates an exemplary process flow for measuring the concentration and type of one or more substances in a sample using a system comprising a shared detector according to examples of the disclosure.

FIG. 3 illustrates an exemplary system and FIG. 4 illustrates an exemplary process flow for measuring the concentration and type of one or more substances in a sample using a system comprising a shared detector according to examples of the disclosure. System 300 can include light source 302 controlled by controller 340 through signal 304. Light source 302 can emit multi-wavelength light 350 towards monochromator 306 (step 402 of process 400). Monochromator 306 can separate multi-wavelength light 350 into one or more discrete wavelengths of light comprising light 352 (step 404 of process 400). Light 352 can be directed towards beamsplitter 310, which can then split light into two light beams: light 354 and light 364 (step 406 of process 400).

Light 354 can be incident on sample 320. A portion of light can be absorbed by the substance in sample 320, and a portion of light can be transmitted through sample 320 (step 408 of process 400). The portion of light that is transmitted through the sample can be referred to as light 356. Light 356 can be directed towards mirror 314. Mirror 314 can direct or change the direction of propagation of light 356 toward selector 324 (step 410 of process 400).

Light 364 can be incident on mirror 312. Mirror 312 can change the direction of propagation of light towards reference 322 (step 412 of process 400). A portion of light 364 can be absorbed by the chemical substance in reference 322, and a portion of light 364 can be transmitted through reference 322 (step 414 of process 400). The portion of light that is transmitted through reference 322 can be referred to as light 366.

Both light 356 and 366 can be incident on selector 324. Selector 324 can be any optical component capable of moving or selecting the light beam to direct towards chopper 334. Chopper 334 can be a component that periodically interrupts the light beam. System 300 can alternate in time between chopper 334 modulating light 356 and modulating light 366. Light is transmitted through chopper 334 can be incident on the active area of detector 330. Both light 356 and light 366 can each comprise a set of photons incident on detector 330. Detector 330 can respond to or measure incident light or photons and can generate an electrical signal indicative of the properties of light.

In a first time, chopper 334 can modulate light 356 (step 416 of process 400). Detector 330 can measure light 356 that has been transmitted through the sample 320 (step 418 of process 400) and can generate an electrical signal 358 indicative of the properties of light 356 (step 420 of process 400). In a second time, chopper 334 can modulate light 366 (step 422 of process 400). Detector 330 can measure light 366 that has been transmitted through reference 322 (step 424 of process 400) and can generate an electrical signal 368 indicative of the properties of light 366 (step 426 of process 400).

Controller 340 can receive both signal 358 and signal 368 at different times. Signal 358 can include the sample signal, and signal 368 can include the reference signal. Controller 340 can divide, subtract, or scale the sample signal by the reference signal (step 428 of process 400) to obtain a ratio, for example. The ratio can be converted to absorbance by using Equation 1, and an algorithm can be applied to the absorbance spectrum to determine the concentration of the substance.

Although system 300 (illustrated in FIG. 3) can compensate for minor fluctuations, drifts, and/or variations in the detector due to the shared detector, it may be difficult for system 300 to discern between different types of drift. There can be multiple types of drift, such as zero drift and gain drift. Zero drift can refer to a change in the zero level over time, thereby preventing a constant (i.e., horizontal) relationship with time. Gain drift can refer to a change in the average number of electronic carriers per generated electron-hole pair. That is, gain drift can refer to a change in the efficiency or ratio of generated electron-hole pairs to the current response of the detector. In order to discern between zero drift and gain drift, the system can be capable of stabilizing one type of drift and measuring the other. For example, to determine the gain drift from the light source, the system can be DC stabilized (i.e., a stable zero drift). However, due to lack of capability for stabilizing one type of drift in system 300, zero drift and gain drift may not be discerned.

In some instances, the presence of stray light can be measured by the detector, which can lead to an erroneous signal and an erroneous determination of the concentration and type of one or more substances. In system 300, the placement of chopper 334 after light has transmitted through sample 320 or reference 322 can lead to the stray light reaching sample 320 or reference 322. The stray light may not contribute to the spectroscopic signal, so by allowing the stray light to reach sample 320 or reference 322, detector 330 can detect the photons included in the stray light. Detecting the photons included in the stray light can lead to erroneous changes in either signal 358 or signal 368. With a change in signal 358 or signal 368, controller 340 may not be able to determine whether or how much this change is due to stray light or due to variations in light source 302. Therefore, system 300 may not be suitable for situations where there can be non-negligible amounts of stray light present.

Figure 5:
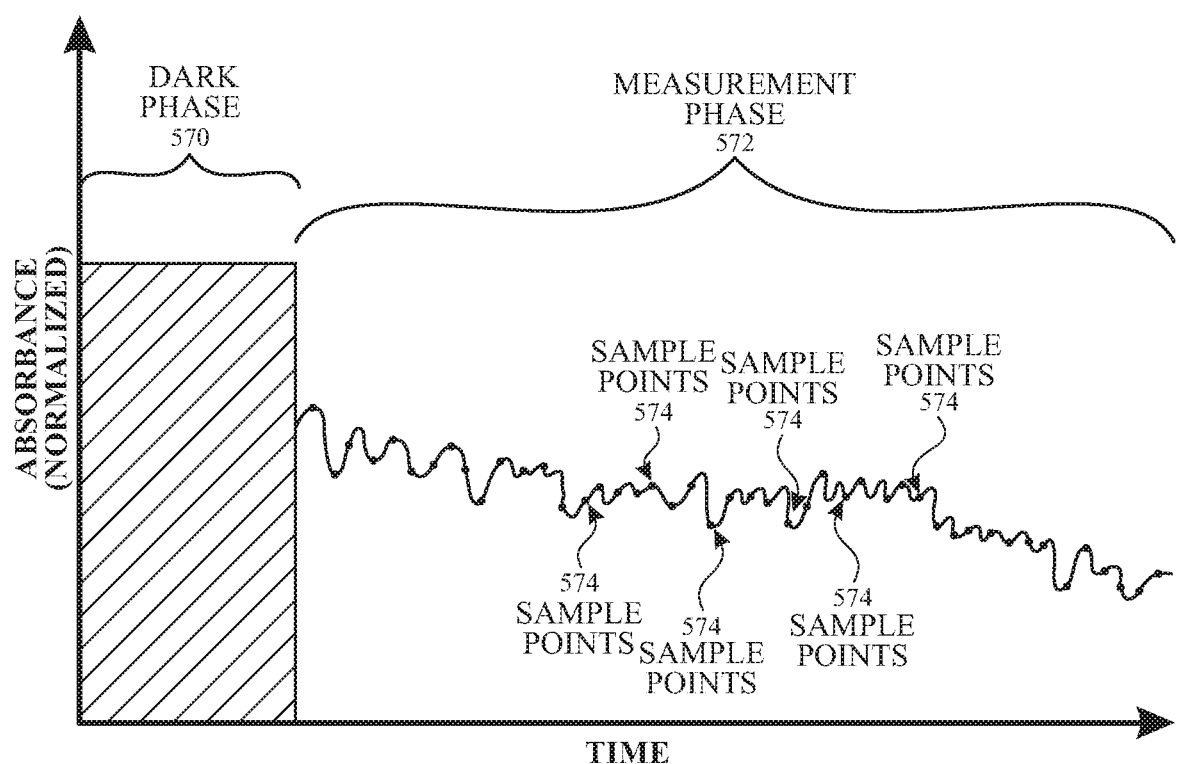
FIG. 5 illustrates an exemplary plot of absorbance measurements for determining the concentration and type of one or more substances according to examples of the disclosure.

When the substance of interest in the sample has a low concentration, a system with increased accuracy and sensitivity, compared to system 100 (illustrated in FIG. 1) and system 300 (illustrated in FIG. 3), may be desired. To measure the concentration and type of one or more substances, system 100 (illustrated in FIG. 1) and system 300 (illustrated in FIG. 3) can measure the sample and reference multiple times. FIG. 5 illustrates an exemplary plot of the absorbance measurements for determining the concentration and type of one or more substances according to examples of the disclosure. The system can begin with dark phase 570, where one or more components in the system can be optimized, calibrated, and/or synchronized to minimize errors. Dark phase 570 can include, for example, measuring the reference absorbance. In some examples, dark phase 570 can include measuring the dark current and noise of the system. A sample with a known, stable concentration of the substance can be placed in the light path where the sample is located. The system can be either on or off. The controller can determine the absorbance and set the "zero level" equal to this absorbance. If the signal has saturated or clipped due to a significant drift, the controller can adjust the light source emission properties until the signal is no longer saturated.

Once dark phase 570 is complete and the zero level has been determined, the system can proceed to measurement phase 572. In measurement phase 572, the concentration of the substance in the sample can be measured by sampling several times to generate a plurality of sample points 574. In some examples, the system can measure tens to hundreds of sample points 574. Once a certain number of sample points 574 have been measured, the controller can average the values of the sample points 574 to determine the absorbance. Measuring multiple sample points and determining the average may be needed because, as illustrated in the figure, the absorbance measurements can include minor perturbations that, if not accounted for, can lead to errors in the determination of the concentration of the substance. In some examples, dark phase 570 can be repeated to re-zero the zero level when the light source changes emission wavelength, after a pre-determined time has elapsed between consecutive dark phases, or after a pre-determined number of sample points have been measured.

In some instances, the measurement procedure illustrated in FIG. 5 can have long times between consecutive dark phases, such that an inaccurate average signal measurement can result due to the set zero level drifting from the actual zero level. The figure illustrates the zero drift or gain drift, where the absorbance signal can start to deviate from a constant (i.e., horizontal) relationship with time due to the zero level or gain value drifting away from the actual zero level or actual gain value, respectively. While the time between consecutive dark phases can be shortened, there can be a limit on the minimum time period between dark phases due to the minimum number of sample points that may be needed for an accurate measurement. This can be particularly true in situations where the SNR is low, which can require tens to hundreds of repeated measurements in order to achieve an average absorbance value that is somewhat accurate.

Figure 6:
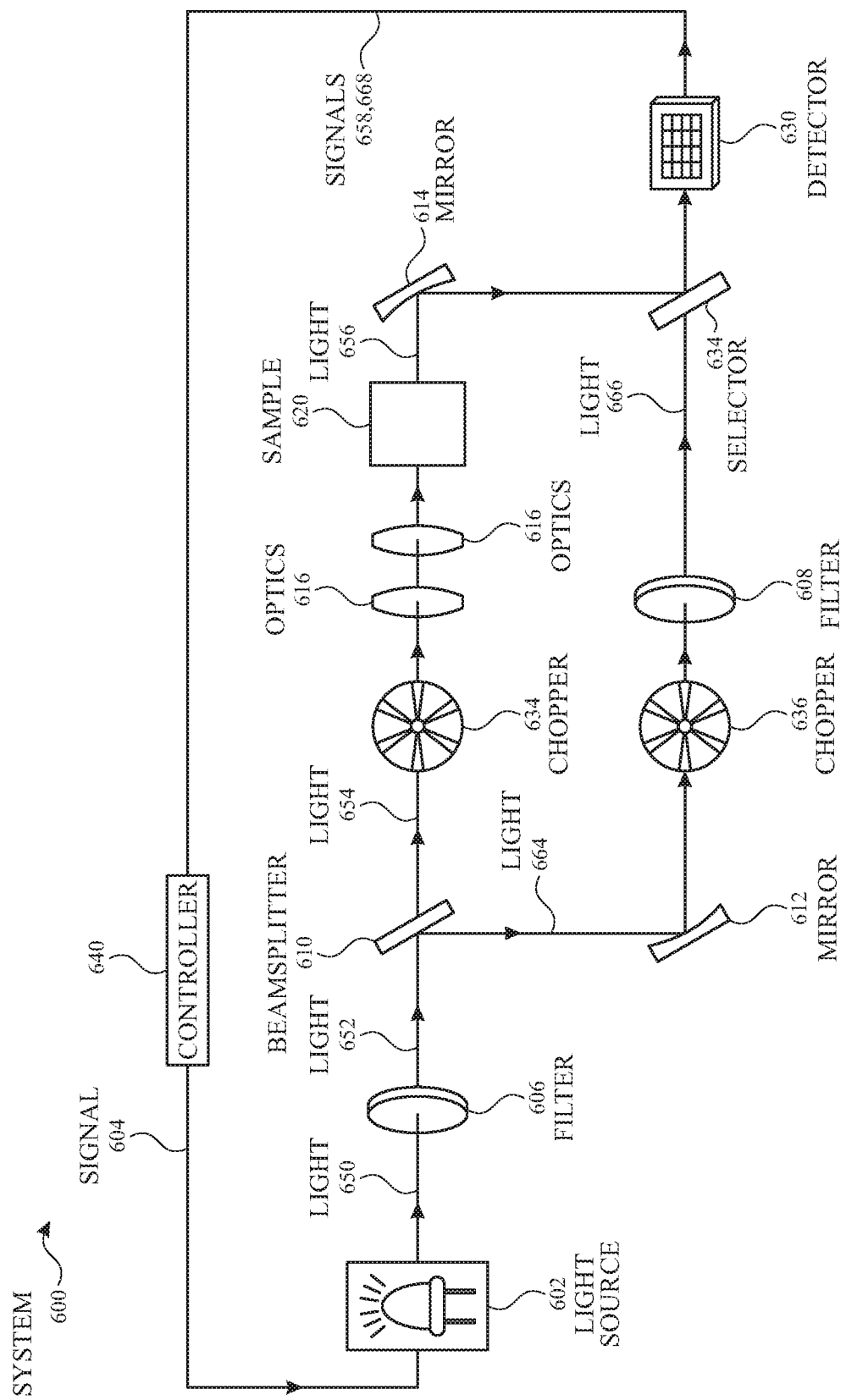
FIG. 6 illustrates an exemplary system comprising a modulator located between the light source and the sample for measuring the concentration and type of one or more substances in a sample according to examples of the disclosure.
Figure 7:
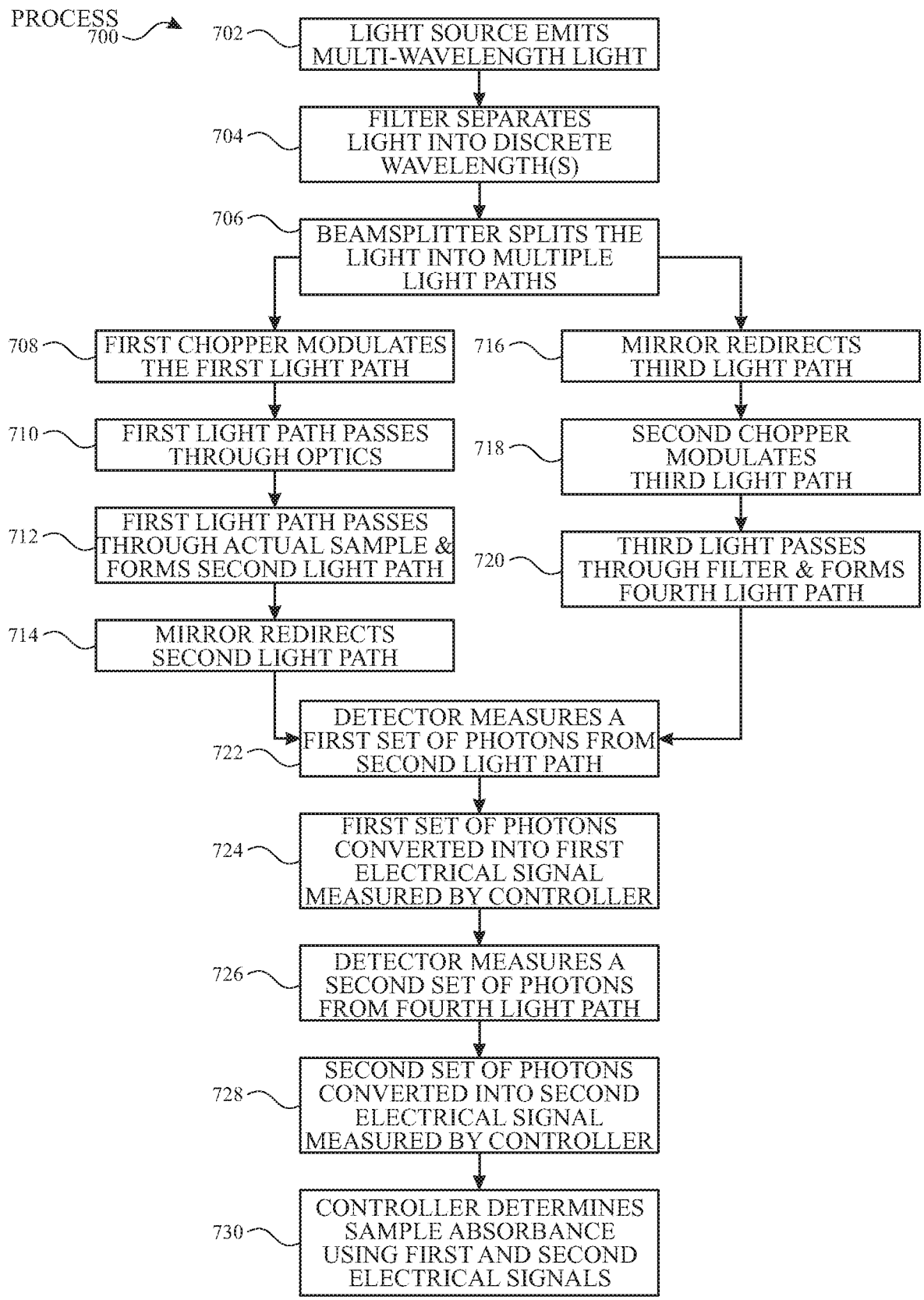
FIG. 7 illustrates an exemplary process flow for measuring the concentration and type of one or more substances in a sample using a system comprising a modulator located between the light source and the sample according to examples of the disclosure.

FIG. 6 illustrates an exemplary system and FIG. 7 illustrates an exemplary process flow for measuring the concentration and type of one or more substances in a sample using a system comprising a modulator located between the light source and the sample according to examples of the disclosure. System 600 can include light source 602 coupled to controller 640. Controller 640 can send signal 604 to light source 602. In some examples, signal 604 can include a current or voltage waveform. Light source 602 can be directed towards filter 606, and signal 604 can cause light source 602 to emit light 650 towards filter 606 (step 702 of process 700). Light source 602 can be any source capable of generating light including, but not limited to, a lamp, a laser, a light emitting diode (LED), an organic LED (OLED), an electroluminescent (EL) source, a super-luminescent diode, any super-continuum source including a fiber-based source, or a combination of one or more of these sources. In some examples, light source 602 can be capable of emitting a single wavelength of light. In some examples, light source 602 can be capable of emitting a plurality of wavelengths of light. In some examples, the plurality of wavelengths can be adjacent to one another, providing a continuous output band. In some examples, light source 602 can be a super-continuum source capable of emitting light in at least a portion of both the SWIR and MWIR ranges. A super-continuum source can be any broadband light source that outputs a plurality of wavelengths. In some examples, light source 602 can be any tunable source capable of generating a SWIR signature.

Filter 606 can be any type of filter capable of tuning or selecting a single wavelength or multiple discrete wavelengths by tuning the drive frequency. In some examples, filter 606 can be an acousto-optic tunable filter (AOTF). In some examples, filter 606 can be an angle tunable narrow bandpass filter. Although not illustrated in the figure, filter 606 can be coupled to controller 640, and controller 640 can tune the drive frequency of filter 606. In some examples, filter 606 can be a passband filter configured to selectively allow one or more continuous bands (i.e., wavelength ranges) of light to transmit through. Light 650 can comprise multiple wavelengths (step 702 of process 700) and after transmitting through filter 606, can form light 652 comprising one or more discrete wavelengths (step 704 of process 700). In some examples, light 652 can comprise fewer wavelengths of light than light 650. Light 652 can be directed towards beamsplitter 610. Beamsplitter 610 can be any type of optic capable of splitting incoming light into multiple light beams. In some examples, each light beam split by the beamsplitter 610 can have the same optical properties. One skilled in the art would appreciate that the same optical properties can include tolerances that result in a 15% deviation. Beamsplitter 610 can split light 652 into two light beams (step 706 of process 700): light 654 and light 664, as illustrated in the figure.

Light 654 can be transmitted through chopper 634, where chopper 634 can modulate the intensity of light 654 (step 708 of process 700). Chopper 634 can be any component capable of modulating the incoming light beam. In some examples, chopper 634 can be an optical chopper. In some examples, chopper 634 can be a mechanical shutter. In some examples, chopper 634 can be a modulator or a switch. Light 654 can be transmitted through optics 616 (step 710 of process 700). Optics 616 can include one or more components configured to change the behavior and properties, such as the beam spot size and/or angle of propagation, of light 654. Optics 616 can include, but are not limited to, a lens or lens arrangement, beam directing element, collimating or focusing element, diffractive optic, prism, filter, diffuser, and light guide. Optics 616 can be placed in any arrangement, such as a resolved path sampling (RPS) system, confocal system, or any optical system suitable for measuring a concentration and type of one or more substances in sample 620 at a sampling interface. The optics can be an optical system capable of resolving multiple angles of incidence on the sample interface and different path lengths included in a plurality of optical paths. In some examples, the optical system can be configured to accept one or more incident light rays with a path length within a range of path lengths and an angle of incidence within a range of angles, and rejecting optical paths with a path length outside the range of path lengths and with an angle of incidence outside the range of angles.

Light 654 can be transmitted through sample 620. Energy can be absorbed at one or more wavelengths by the substance in the sample 620, causing a change in the properties of light 656 exiting the sample (step 712 of process 700). In some examples, light 656 can be formed by reflection or scattering of the substance located in the sample. Light 656 can be incident on mirror 614, which can direct or redirect light 656 towards selector 624 (step 714 of process 700). Mirror 614 can be any type of optics capable of changing the direction or angle of propagation of light. For example, mirror 614 can be a concave mirror configured to change the direction of light propagation by 90°. In some examples, the system can, additionally or alternatively, include, but is not limited to, non-reflective component(s) (e.g., curved waveguide) for light redirection.

Light 664 can be incident on mirror 612 (step 716 of process 700). Mirror 612 can redirect light 664 towards detector 630. Mirror 612 can be any mirror capable of changing the direction or angle of propagation of light. In some examples, the system can, additionally or alternatively, include, but is not limited to, non-reflective component(s) (e.g., curved waveguide) for light redirection. In some examples, mirror 612 can have the same optical properties as mirror 614. Light 664 can be transmitted through chopper 636, which can modulate the intensity of light 664 (step 718 of process 700). In some examples, chopper 634 and chopper 636 can have the same chopper characteristics, such as chopping frequency and disc configuration. One skilled in the art would appreciate that the same chopper characteristics can include tolerances that result in a 15% deviation. In some examples, chopper 636 can be a shutter, such as a microelectromechanical system (MEMS) shutter. In some examples, chopper 636 can be a modulator or a switch. The modulated light can be transmitted through filter 608 to generate light 666 (step 720 of process 700). Filter 608 can be any type of filter capable of selectively transmitting light. In some examples, filter 608 can be a neutral density filter, blank attenuator, or filter configured to attenuate or reduce the intensity of all wavelengths of light. In some examples, filter 608 can attenuate light by a pre-determined or known constant value or attenuation factor.

Both light 656 and light 666 can be incident on selector 624. Selector 624 can be any optical component capable of moving or selecting the light beam to be directed towards detector 630. System 600 can alternate in time between allowing light 656 to be incident on detector 630 at one time and allowing light 666 to be incident on detector 630 at another time. In both situations, light 656 and light 666 can each include a set of photons. The photons can be incident on detector 630, and detector 630 can generate an electrical signal indicative of the properties of the incident light or number of impinging photons. Detector 630 can measure the set of photons from light 656 (step 722 of process 700) and can generate an electrical signal 658 (step 724 of process 700). Signal 658 can be indicative of the properties of light 656, which can represent the energy from light 654 returned by the substance of interest in sample 620. Detector 630 can measure the set of incident photons from light 666 (step 726 of process 700) and can generate an electrical signal 668 (step 728 of process 700). Signal 668 can be indicative of the properties of light 664 that was not absorbed by filter 608 and can act as a reference signal.

Detector 630 can be any type of detector capable of measuring or responding to light or photons, such as photodiodes, photoconductors, bolometers, pyroelectric detectors, charge coupled devices (CCDs), thermocouples, thermistors, photovoltaics, and photomultiplier tubes. Detector 630 can include a single detector pixel or a detector array, such as a multi-band detector or a focal plane array (FPA). A detector array can include one or more detector pixels disposed on a substrate. A detector pixel can include one or more detector elements with a common footprint. A detector element can be an element designed to detect the presence of light and can individually generate a signal representative of the detected light. In some examples, detector 630 can be any type of detector capable of detecting light in the SWIR. Exemplary SWIR detectors can include, but are not limited to, Mercury Cadmium Telluride (HgCdTe), Indium Antimonide (InSb), and Indium Gallium Arsenide (InGaAs). In some examples, detector 630 can be a SWIR detector capable of operating in the extended wavelength range (up to 2.7 μm).

Controller 640 can receive both signal 658 and signal 668, where each signal can be received at a different time. Signal 658 can include the sample signal, and signal 668 can include the reference signal. Controller 640 can divide, subtract, or scale the sample signal by the reference signal (step 730 of process 700) to obtain a ratio, for example. The ratio can be converted to absorbance by using Equation 1, and an algorithm can be applied to the absorbance spectrum to determine the concentration of the substance. In some examples, controller 640 can compare the reference absorbance to one or more absorbance values stored in a lookup table or in memory to determine the concentration and type of one or more substances in the sample. Although Equation 2 and the above discussion is provided the context of absorbance, examples of the disclosure include, but are not limited to, any optical property such as reflectivity, refractive index, density, concentration, scattering coefficient, and scattering anisotropy.

System 600 can be an alternative to system 100 (illustrated in FIG. 1) and system 300 (illustrated in FIG. 3). System 600 can have a shared detector (e.g., detector 630) to measure light through sample 620 and (an optional) filter 608. Utilizing a shared detector can eliminate or alleviate unpredictable changes in sensitivity, detectivity, and/or absorbance due to differing (or random) fluctuations, drifts, and/or variations. As discussed above, the fluctuations, drifts, and/or variations can be due to initialization, 1/f noise, and/or environmental changes that can affect the two detectors in a different manner. Additionally, system 600 can tolerate and discern non-negligible amounts of stray light due to the placement of chopper 634 and chopper 636 in the light path prior to being incident on sample 620 and filter 608, respectively. Furthermore, unlike system 100 and system 300, system 600 can account for any fluctuations, drifts, and/or variations originating from both light source 602 and detector 630.

In some examples, attenuation of incoming light by filter 608 by a pre-determined or known constant value can lead to a mismatch between light 656 (i.e., light that is transmitted through sample 620) and light 666 (i.e., light that is transmitted through filter 608). This mismatch can be due to differing absorbance at different wavelengths. At one or more wavelengths, the substance in sample 620 can absorb a large percentage of light, and therefore, a low attenuation factor for filter 608 would be suitable at those one or more wavelengths. At other wavelengths, the same substance and same concentration of that substance in sample 620 can absorb very little light, and therefore, a high attenuation factor for filter 608 would be suitable. Since filter 608 can attenuate by a constant value for all wavelengths of interest, accurate measurements of system 600 can be limited to only one or a small number of wavelengths. Furthermore, a blank attenuator or neutral density filter may not be effective when detecting a low concentration of the substance of interest in the sample if the attenuation factor is not optimal. Therefore, a system that can account for the variations in absorbance with wavelength in sample 620 and can be capable of detecting a low concentration of the substance in the sample may be desired.

Figure 8:
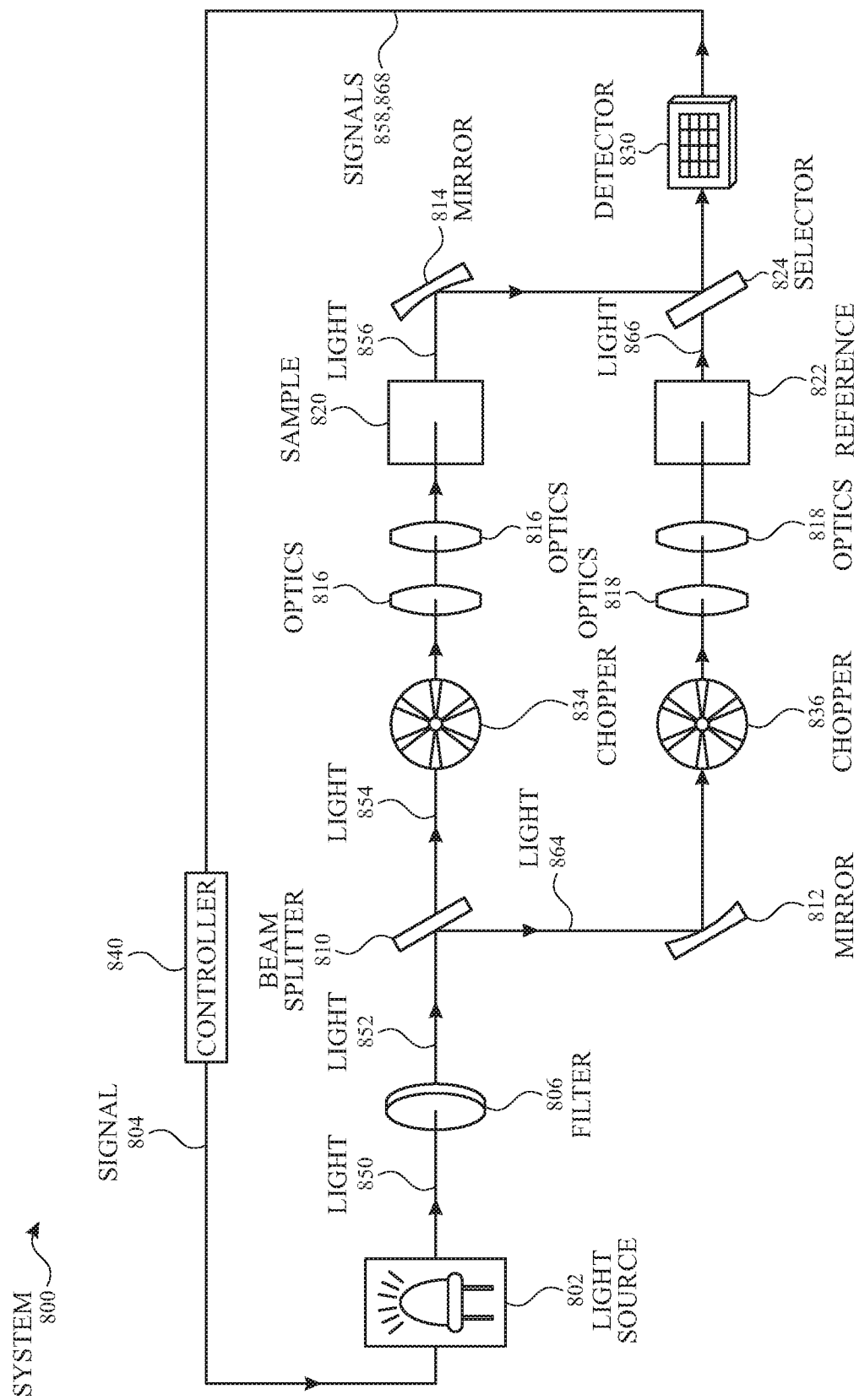
FIG. 8 illustrates an exemplary system comprising a modulator located between the light source and the sample for measuring the concentration and type of one or more substances in a sample according to examples of the disclosure.
Figure 9:
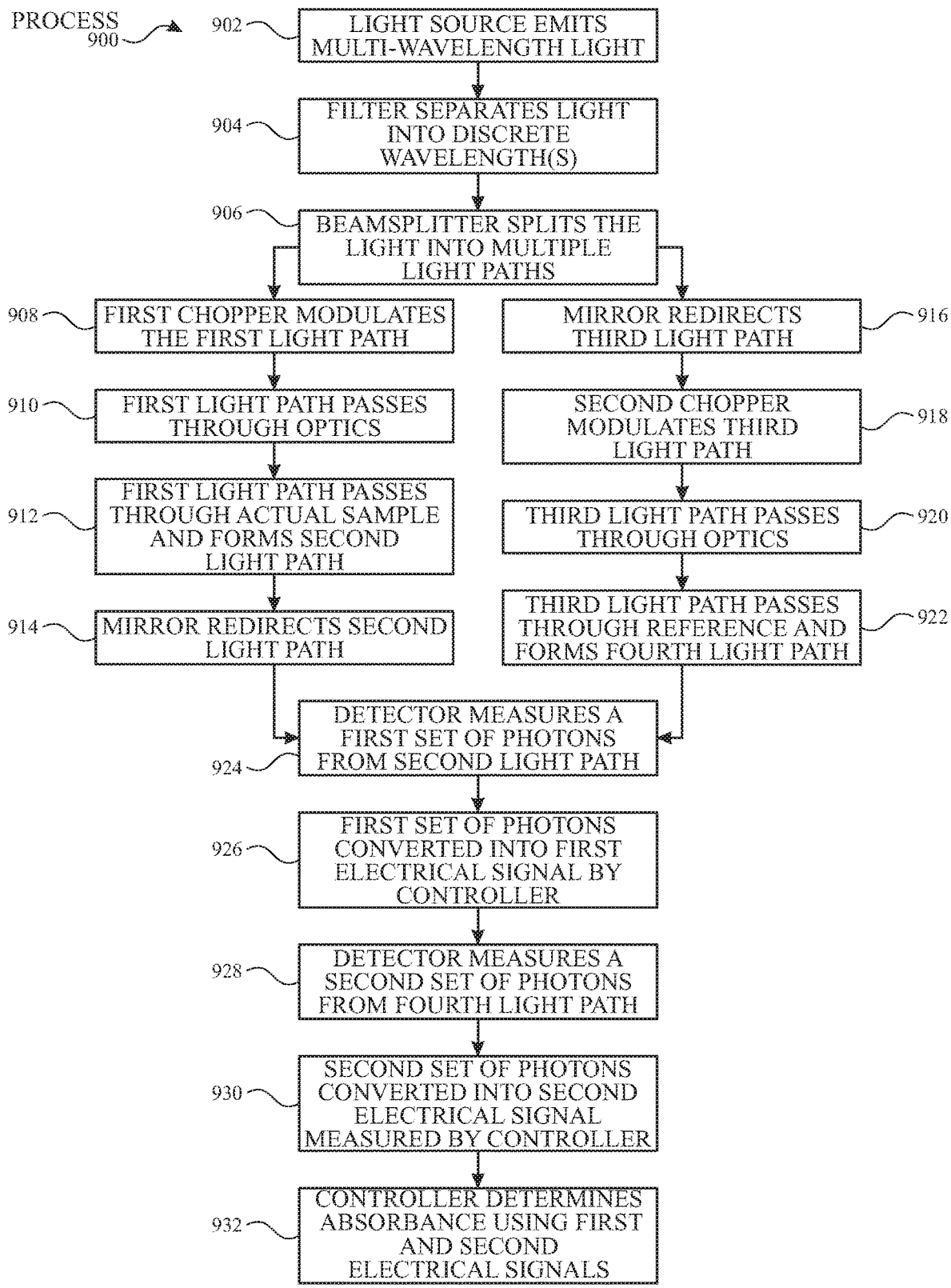
FIG. 9 illustrates an exemplary process flow for measuring the concentration and type of one or more substances in a sample using a system comprising a modulator located between the light source and the sample according to examples of the disclosure.

FIG. 8 illustrates an exemplary system and FIG. 9 illustrates an exemplary process flow for measuring the concentration and type of one or more substances in a sample at a sampling interface using a system comprising a modulator located between the light source and the sample according to examples of the disclosure. System 800 can include light source 802 coupled to controller 840. Controller 840 can send signal 804 to light source 802. In some examples, signal 804 can include a current or voltage waveform. Light source 802 can be directed towards filter 806, and signal 804 can cause light source 802 to emit light 850 (step 902 of process 900). Light source 802 can be any source capable of emitting light 850. In some examples, light source 802 can be capable of emitting a single wavelength of light. In some examples, light source 802 can be capable of emitting a plurality of wavelengths of light. An exemplary light source can include, but is not limited to, a lamp, laser, LED, OLED, EL source, super-luminescent diode, super-continuum source, fiber-based source, or a combination of one or more of these sources. In some examples, the plurality of wavelengths can be close to or adjacent to one another providing a continuous output band. In some examples, light source 802 can be any tunable source capable of generating a SWIR signature. In some examples, light source 802 can be a super-continuum capable of emitting light at least in a portion of both the SWIR and MWIR.

Filter 806 can be any filter capable of tuning and selecting a single wavelength or multiple discrete wavelengths by tuning the drive frequency. In some examples, filter 806 can be an AOTF. In some examples, filter 606 can be an angle tunable narrow bandpass filter. Although not illustrated in the figure, filter 806 can be coupled to controller 840, and controller 840 can tune the drive frequency of filter 806. In some examples, filter 806 can be a transmit band filter configured to selectively allow one or more continuous bands (i.e., wavelength ranges) of light to be transmitted through. Light 850 can comprise multiple wavelengths and, after being transmitted through filter 806, can form light 852 comprising one or more discrete wavelengths (step 904 of process 900). In some examples, light 852 comprises fewer wavelengths of light than light 850. Light 852 can be directed towards beamsplitter 810. Beamsplitter 810 can be any type of optic capable of splitting incoming light into multiple light beams. In some examples, each light beam split by beamsplitter 810 can have the same optical properties. One skilled in the art would appreciate that the same optical properties can include tolerances that result in a 15% deviation. As illustrated in the figure, beamsplitter 810 can split light 852 into two light beams: light 854 and light 864 (step 906 of process 900).

Light 854 can be transmitted through chopper 834, where chopper 834 can modulate the intensity of light 854 (step 908 of process 900). Chopper 834 can be any component capable of modulating or periodically interrupting the incoming light beam. In some examples, chopper 834 can be an optical chopper. In some examples, chopper 834 can be a mechanical shutter, such as a MEMS shutter. In some examples, chopper 834 can be a modulator or a switch. Light 854 can be transmitted through optics 816 (step 910 of process 900). Optics 816 can include one or more components configured to change the behavior and properties of the light, such as the beam spot size and/or angle of propagation, of light 854. Optics 816 can include, but are not limited to, a lens or lens arrangement, beam directing element, collimating or focusing element, diffractive optic, prism, filter, diffuser, and light guide. Optics 816 can include any type of optical system, such as a RPS system, confocal system, or any optical system suitable for measuring a concentration and type of one or more substances in sample 820.

Light 854 can be directed towards sample 820. Sample 820 can absorb a portion of light 854 and a portion of light 854 can be transmitted at one or more wavelengths (step 912 of process 900). A portion of light 854 can be absorbed by the substance in sample 820, and a portion of light 854 can be transmitted through the sample 820. The portion of light 854 that is transmitted through the sample 820 can be referred to as light 856. In some examples, light 856 can be formed by reflection or scattering of the substance located in sample 820. Light 856 can be directed towards mirror 814, and mirror 814 can redirect light 856 towards mirror 814 (step 914 of process 900). Mirror 814 can be any type of optics capable of changing the direction of light propagation. In some examples, mirror 814 can be a concave mirror configured to change the direction of light propagation by 90°. In some examples, the system can, additionally or alternatively, include, but is not limited to, non-reflective component(s) (e.g., curved waveguide) for light redirection.

The second light path formed by the beamsplitter 810 splitting light 852 can be referred to as light 864. Light 864 can be directed towards mirror 812. Mirror 812 can be any type of optics capable of changing the direction of the propagation of light 864. Mirror 812 can direct or redirect light 864 towards selector 824 (step 916 of process 900). Light 864 can be transmitted through chopper 836, and chopper 836 can modulate light 864 (step 918 of process 900). Chopper 836 can be any component capable of modulating the intensity of the incoming light beam. In some examples, chopper 834 and chopper 836 can have the same chopping characteristics, such as chopping frequency and disc configuration. One skilled in the art would appreciate that the same chopping characteristics can include tolerances that result in a 15% deviation. In some examples, chopper 836 can be a mechanical shutter, such as a MEMS shutter. In some examples, chopper 834 can be an optical modulator or a switch. Light 864 can be transmitted through optics 818 (step 920 of process 900). Optics 818 can include one or more lenses, beam directing elements, collimating or focusing elements, diffractive optics, prisms, filters, diffusers, light guides, or a combination of one or more these optical elements and can be arranged in any arrangement (e.g., RPS system or confocal system) suitable for measuring a concentration and type of one or more substances in sample 820 or reference 822. In some examples, optics 818 can have the same components, arrangement, and/or characteristics as optics 816.

Light exiting optics 818 can be incident on reference 822 (step 922 of process 900). Reference 822 can have the same spectroscopic properties (e.g., scattering characteristics, reflection characteristics, or both) as sample 820. One skilled in the art would appreciate that the same spectroscopic properties can include tolerances that result in a 15% deviation. In some examples, reference 822 can be a copy or a "phantom" replica of sample 820. In some examples, the absorption spectra of reference 822 can be the same as the absorption spectra of sample 820. One skilled in the art would appreciate that the same absorption spectra can include tolerances that result in a 15% deviation. A portion of light can be absorbed by reference 822, and a portion of light can be transmitted through reference 822, forming light 866. After transmitting through reference 822, light 866 can be directed towards selector 824.

Selector 824 can be any optical component capable of moving or selecting the light beam to be directed towards detector 830. In some examples, selector 824 can be coupled to controller 840, and controller 840 can send a signal (not shown) to control the movement of selector 824. In one time period, selector 824 can allow light 856 to be incident on the active area of detector 830. Light 856 can comprise a set of photons, and detector 830 can measure the number of photons in light 856 (step 924 of process 900). Detector 830 can generate an electrical signal 858 indicative of the properties (or the number of photons) of light 856 (step 926 of process 900). Signal 858 can be sent to controller 840, which can store and/or process the signal. In another time period, selector 824 can allow light 866 to be incident on the active area of detector 830. Light 866 can also comprise a set of photons, and detector 830 can measure the number of photons in light 866 (step 928 of process 900). Detector 830 can generate an electrical signal 868 indicative of the properties (or the number of photons) of light 866 (step 930 of process 900). Signal 868 can be sent to controller 840, which can store and/or process the measured signal.

Detector 830 can include single detector pixel or a detector array. In some examples, detector 830 can be any type of detector capable of detecting light in the SWIR. In some examples, detector 830 can be a HgCdTe, InSb, or InGaAs single detector or a FPA. In some examples, detector 830 can be a SWIR detector capable of operating in the extended wavelength range of up to 2.7 μm.

Controller 840 can receive both signal 858 and signal 868 at different times. Signal 858 can include the sample signal, and signal 868 can include the reference signal. In some examples, controller 840 can divide, subtract, or scale the sample signal by the reference signal to obtain a ratio. The ratio can be converted to absorbance by using Equation 1, and an algorithm can be applied to the absorbance spectrum to determine the concentration of the substance of interest in sample 820 (step 932 of process 900). In some examples, controller 840 can compare the reference absorbance to one or more absorbance values stored in a lookup table (LUT) or in memory to determine the concentration and type of one or more substances in sample 820. In some examples, signal 858 can differ from signal 868 by the amount of drift from light source 802, detector 830, or both. Controller 840 can divide, subtract, or scale signal 858 by signal 868 to determine the amount of drift. Although Equation 2 and the above discussion are provided in the context of absorbance, examples of the disclosure can include, but are not limited to, any optical property, such as reflectivity, refractive index, density, concentration, scattering coefficient, and scattering anisotropy.

System 800 can include all of the advantages of system 600 while also accounting for variations in the absorbance of sample 820 with wavelength. Although the systems disclosed above illustrate one or more components, such as choppers, optics, mirrors, sample, light source, filters, and detector, one of ordinary skill in the art would appreciate that the system is not limited to only the components illustrated in the exemplary figures. Furthermore, one of ordinary skill in the art would appreciate that the location and arrangement of such components are not limited solely to the location and arrangement illustrated in the exemplary figures.

While an ideal layout or arrangement of the system would have all components shared between the light path traveling through the sample and the light path traveling the reference, such an arrangement might not be physically possible or feasible. Examples of the disclosure can include locating one or more components susceptible to drifting such that these components are common or shared among the two (or multiple) light paths, and locating components not susceptible to drifting (i.e., stable components) to be non-common or not shared among the two (or multiple light paths). For example, components susceptible to drifting can include any electronics or optoelectronic components. Additionally, components not susceptible to drifting can include optics. As illustrated in both system 600 of FIG. 6 and system 800 of FIG. 8, the light source (e.g., light source 602 and light source 802) and the detector (e.g., detector 630 and detector 830) can be susceptible to drifting, and therefore can be shared between the two light paths (e.g., light 656 and light 666; light 856 and light 866). On the other hand, choppers (e.g., chopper 634, chopper 636, chopper 834, and chopper 836) and optics (e.g., optics 616, optics 816, and optics 818)

can be stable and not susceptible to drifting, and therefore can be individual to each light path.

Figure 10:
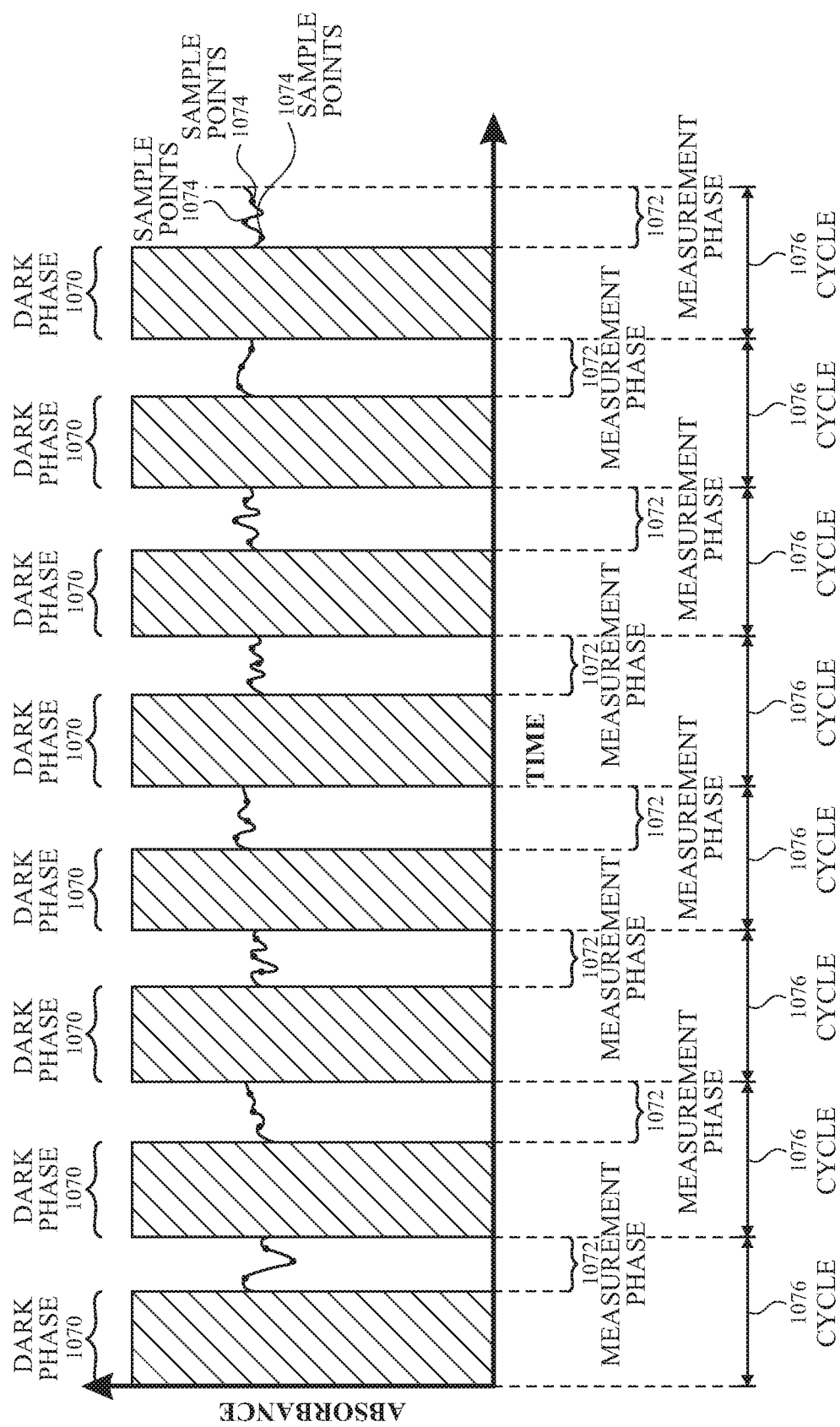
FIG. 10 illustrates an exemplary plot of absorbance measurements used for determining the concentration and type of one or more substances according to examples of the disclosure.

FIG. 10 illustrates an exemplary plot of absorbance measurements used for determining the concentration and type of one or more substances according to examples of the disclosure. The absorbance measurement can comprise a plurality of cycles 1076. Each cycle 1076 can include one or more dark phases 1070 and one or more measurement phases 1072. Each dark phase 1070 can include one or more steps to measure the zero level, noise floor, stray light leakage, or a combination thereof. For example, the light source in the system can be off or deactivated such that emitted light is not incident on the sampling interface or reference. The detector can take a measurement to determine the amount of dark current and stray light leakage. In some examples, this measurement can be used to determine the zero level. The detector can send this measurement to the controller, and the controller can store the measurement and/or the relevant information in memory. The controller can use this information to determine the actual absorbance of the substance in the sample or reference, or can use this information to set the zero level.

Measurement phases 1072 can be interspersed in between the dark phases 1070. Measurement phases 1072 can include measuring the absorbance spectrum of the sample during one time and measuring the absorbance spectrum of the reference during another time. In some examples, any optical property (e.g., reflectivity, refractive index, density, concentration, scattering coefficient, and scattering anisotropy) can be measured instead of, or in addition to, the absorbance. The controller can divide, subtract, or scale the absorbance spectrum of the sample by the absorbance spectrum of the reference. In some examples, the controller can compare the reference absorbance to one or more absorbance values stored in a LUT or memory to determine the concentration of the substance in the sample. The measurement can be repeated multiple times within each measurement phase 1072 to generate a plurality of sample points 1074, and the average of the sample points 1074 can be used. In some examples, the controller can compile sample points 1074 from multiple cycles 1076 when determining the average signal value. In some examples, the duration of at least one measurement phase 1072 can be based on a pre-determined or fixed number of sample points 1074. In some examples, the number of sample points 1074 within at least one measurement phase 1072 can be less than 10. In some examples, the number of sample points 1074 within at least one measurement phase 1072 can be less than 100. In some examples, the duration of at least one measurement phase 1072 can be based on the stability (e.g., time before drifting by more than 10%) of the reference. For example, if the reference remains chemically stable for 60 seconds, the duration of measurement phase 1072 can also be 60 seconds. In some examples, the duration of measurement phase 1072 can be based on the stability of the shared components (e.g., light source and detector). Once a measurement phase 1072 is complete, the controller can proceed to the next cycle 1076.

By calibrating more frequently, both the zero drift and gain drift can be accounted for. Additionally, unlike the procedure illustrated in FIG. 5, the drift can be corrected at every cycle (or after a multiple number of cycles), which can prevent any significant deviation from the zero level. Furthermore, any fluctuations and/or variations can be compensated for prior to, during, or shortly after the signal begins to deviate. By compensating for the fluctuations, drift, and/or variations and re-zeroing the zero level early on, instead of after tens or hundreds of sample points 1074 are measured, the accuracy of the averaged signal value can be improved. In some examples, the number of sample points 1074 taken during measurement phase 1072 can be less than the number of sample points 574 taken during measurement phase 572 (illustrated in FIG. 5). In some examples, measurement phase 1072 can be shorter than measurement phase 572.

Figure 11:
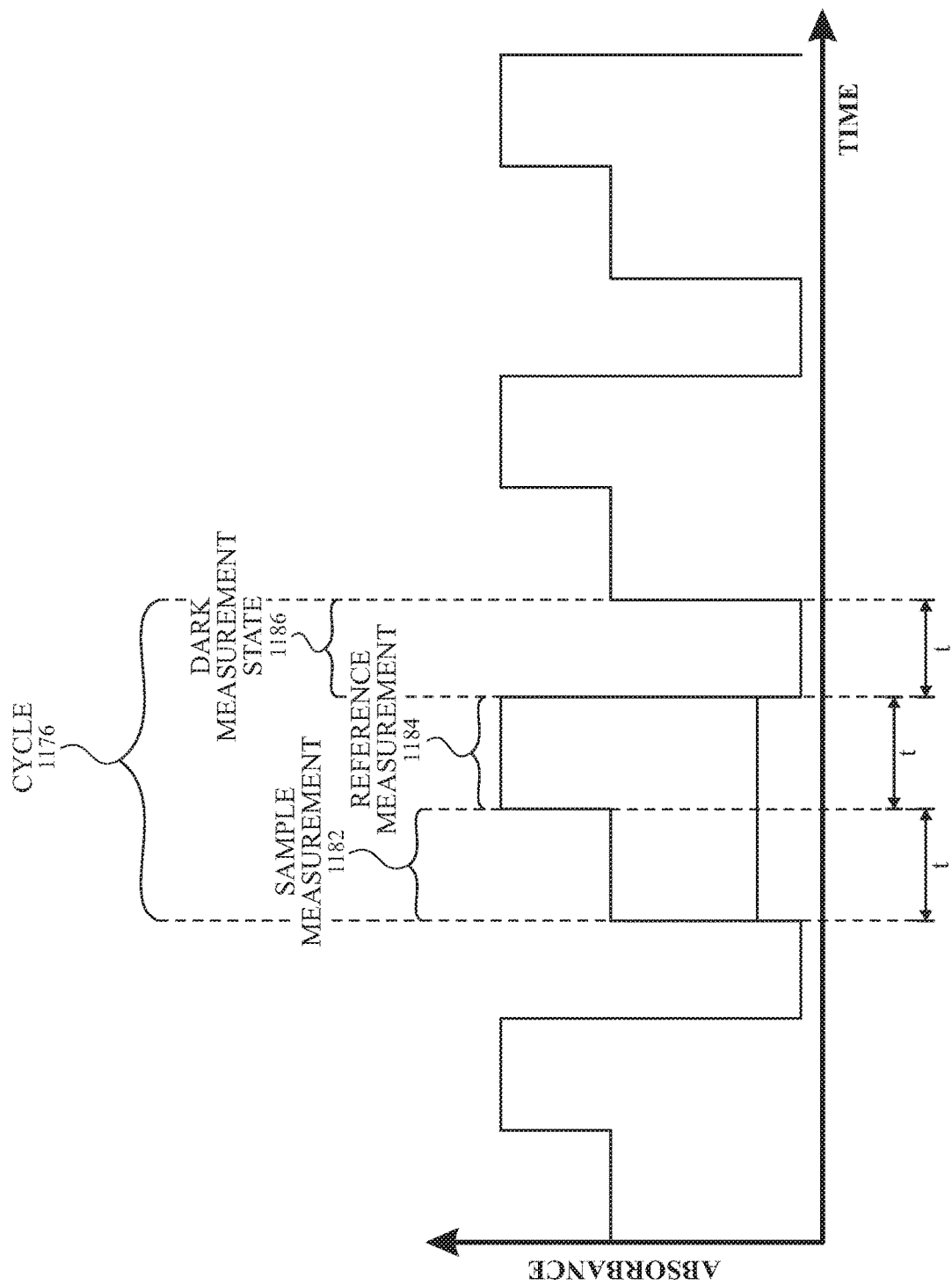
FIG. 11 illustrates an exemplary plot of the absorbance measurements including three measurement states with an equal measurement time distribution according examples of the disclosure.

In some examples, each cycle can include three measurement "measurement states." FIG. 11 illustrates an exemplary plot of the absorbance measurements including three measurement states with equal measurement time distribution according examples of the disclosure. The absorbance measurements can include a plurality of cycles 1176. Each cycle 1176 can include three measurement states: sample measurement state 1182, reference measurement state 1184, and dark measurement state 1186. Sample measurement state 1182 can be configured to measure the absorbance (or any other optical property) of the sample (e.g., sample 620 illustrated in FIG. 6 or sample 820 illustrated in FIG. 8). Reference measurement state 1184 can be configured to measure the absorbance (or any other optical property) of the reference (e.g., filter 608 illustrated in FIG. 6 or reference 822 illustrated in FIG. 8). Dark measurement state 1186 can be configured to measure the dark current, stray light leakage, and/or noise. In some examples, the system can be configured to process, assess, and/or allocate the time distribution during dark measurement state 1186. The system can be configured to repeat the sample measurement state 1182, reference measurement state 1184, and dark measurement state 1186, where none of the measurement states is shared in time. The measurement states can be configured with a time duration t. In some examples, time duration t of each measurement state can be the same. One skilled in the art would appreciate that the same time duration can include tolerances that result in a 15% deviation. In this manner, the time allocated to sample measurement state 1182 can be 33% (or $\frac{1}{3}^{rd}$) of the time for cycle 1176. Similarly, the time allocated to reference measurement state 1184 and dark measurement state 1186 can each be 33% (or $\frac{1}{3}^{rd}$) of time for cycle 1176.

Although the cycle time can be equally distributed among each of the three measurement states, the signal value, noise levels, and SNR for one measurement state (or measurement type) can be different from another measurement state in the same cycle. Therefore, the measurement time distribution of the three measurement states may be optimal for one measurement state, but may not be optimal for the other measurement states in the cycle. Additionally, the signal value, noise levels, and SNR may differ with wavelength, surrounding environment, and/or measurement location of the substance in the sample. As a result, the optimal measurement time distribution can be different for different wavelengths and different locations in the sample. Additionally, configuring the measurements to include three measurement states with equal measurement time distributions can lead to long measurement times with unimportant information, erroneous measurement data, low SNR, or a combination thereof.

Figure 12:
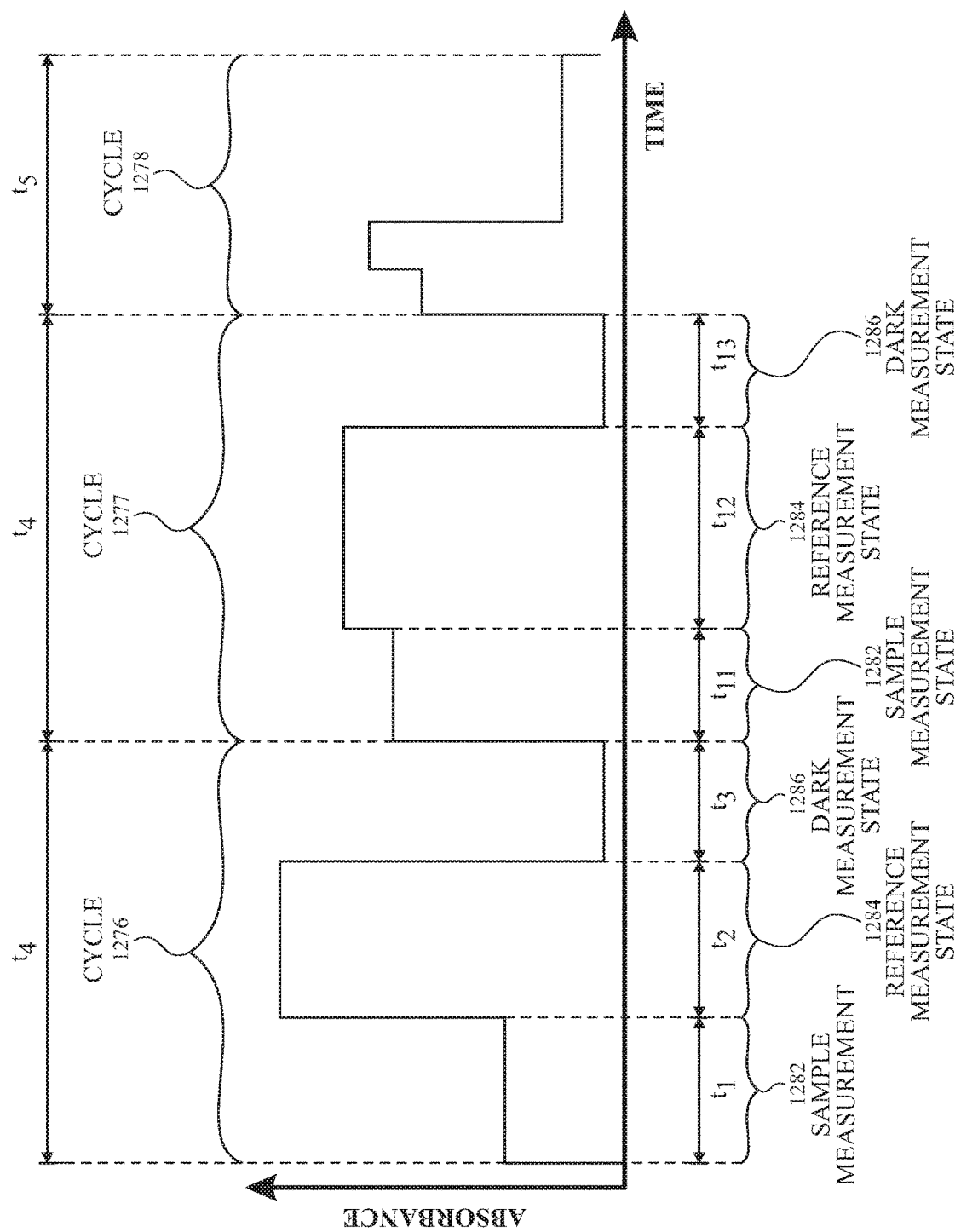
FIG. 12 illustrates an exemplary plot of absorbance measurements including three measurement states with unequal measurement time distribution according to examples of the disclosure.

FIG. 12 illustrates an exemplary plot of absorbance measurements including three measurement states with unequal measurement time distribution according to examples of the disclosure. The absorbance measurements can include a plurality of cycles, such as cycle 1276, cycle 1277, and cycle 1278. In some examples, cycle 1276 can be configured with the same time duration $t_4$ as cycle 1277. Each cycle can include three measurement states: sample measurement state 1282, reference measurement state 1284, and dark measurement state 1286. Sample measurement state 1282 can be configured to measure the absorbance of the sample for a time $t_1$, reference measurement state 1284 can be configured to measure the absorbance of the reference for a time $t_2$, and dark measurement state 1286 can be configured to measure the absorbance of the noise (e.g., dark current and stray light) for a time $t_3$. In some examples, the sample signal can be weak or can have a low intensity (e.g., less than 20% of the intensity of the reference signal), such as illustrated in cycle 1276. The system can allocate the time for sample measurement state 1282 in cycle 1276 to be greater than the time for the other measurement states. For example, the intensity of the sample signal can be 4.3% of the intensity of the reference signal, and time $t_4$ can be distributed with times $t_1$, $t_2$, and $t_3$ comprising 65%, 30%, and 5%, respectively. In some examples, time $t_1$ can be greater than or equal to 50% of the time for cycle 1276.

In some examples, the sample signal can be strong or can have a high intensity relative to the reference signal, such as illustrated in cycle 1277. Sample measurement state 1282 can be configured with time $t_{11}$, reference measurement state 1284 can be configured with time $t_{12}$, and dark measurement state 1286 can be configured with a time $t_{13}$. The system can allocate the time for reference measurement state 1284 in cycle 1277 to be greater than the time for the other measurement states. For example, the intensity of the sample signal can be 85% of the intensity of the reference signal, and time $t_4$ can be distributed with times $t_{11}$, $t_{12}$, and $t_{13}$ comprising 20%, 60%, and 5%, respectively. In some examples, time $t_{12}$ can be greater than or equal to 50% of the time for cycle 1277.

As illustrated in the figure, the measurement time per cycle can be distributed based on the signal values and noise levels, and this distribution can change dynamically. For example, if the noise levels are low, the system can be configured to spend less time in the dark measurement state. In some examples, each cycle time can be different and/or can be dynamically changed. In some examples, the measurement time distribution can be based on the operating wavelength. For example, the operating wavelengths can include one or more wavelengths of lower importance (e.g., due to a lower probability of absorbance by the substance of interest), and therefore, the system can be configured to spend less time measuring the one or more wavelengths of lower importance. In this manner, the overall measurement time can be reduced, long measurement times with unimportant information can be avoided, and measurement accuracy can be improved.

In some examples, the measurement time distribution can be based on a pre-determined or targeted SNR. For example, if the signal values are weak, the system can be configured to spend more time in the sample measurement state or the reference measurement state, so that an accurate signal value can be measured and unimportant measurement information can be avoided. In some examples, the time spent measuring the noise can be dynamically changed based on the SNR, and the remaining time can be distributed such that half of the remaining time is spent measuring the sample and the other half of the remaining time is spent measuring the reference.

In some examples, the measurement time distribution can be based on the measured location in the sample or the associated detector pixel. Each detector pixel can be associated with a location or a corresponding optical path within the sample. In some examples, different optical paths can be incident on different locations in the sample. In some examples, the sample signal value of the detector pixels can be different. Different sample signal values can be due to any number of sources, such as differing absorbance at one location in the sample from another, drift from the system components (e.g., light source, waveguides, modulators, optics, detectors), or changes in operating conditions (e.g., operating temperature of the components or environmental changes). Therefore, the system can be configured with at least two detector pixels with different measurement time distribution values.

Because the optimal measurement time distribution can vary based on signal values, noise levels, wavelength, and measurement location in the sample, the system can be configured to dynamically change the actual measurement time distribution, which can lead to reduced overall measurement time without compromising measurement accuracy with improved SNR. In some examples, the system can include a LUT that can include the actual measurement time distribution values and associations to the operating wavelength and detector pixel. In some examples, a LUT can store various configurations from which a configuration can be selected based on calibration-phase measurements. The system can be optimized and tuned based on the operation conditions for the measurement and/or application of the system.

Figure 13:
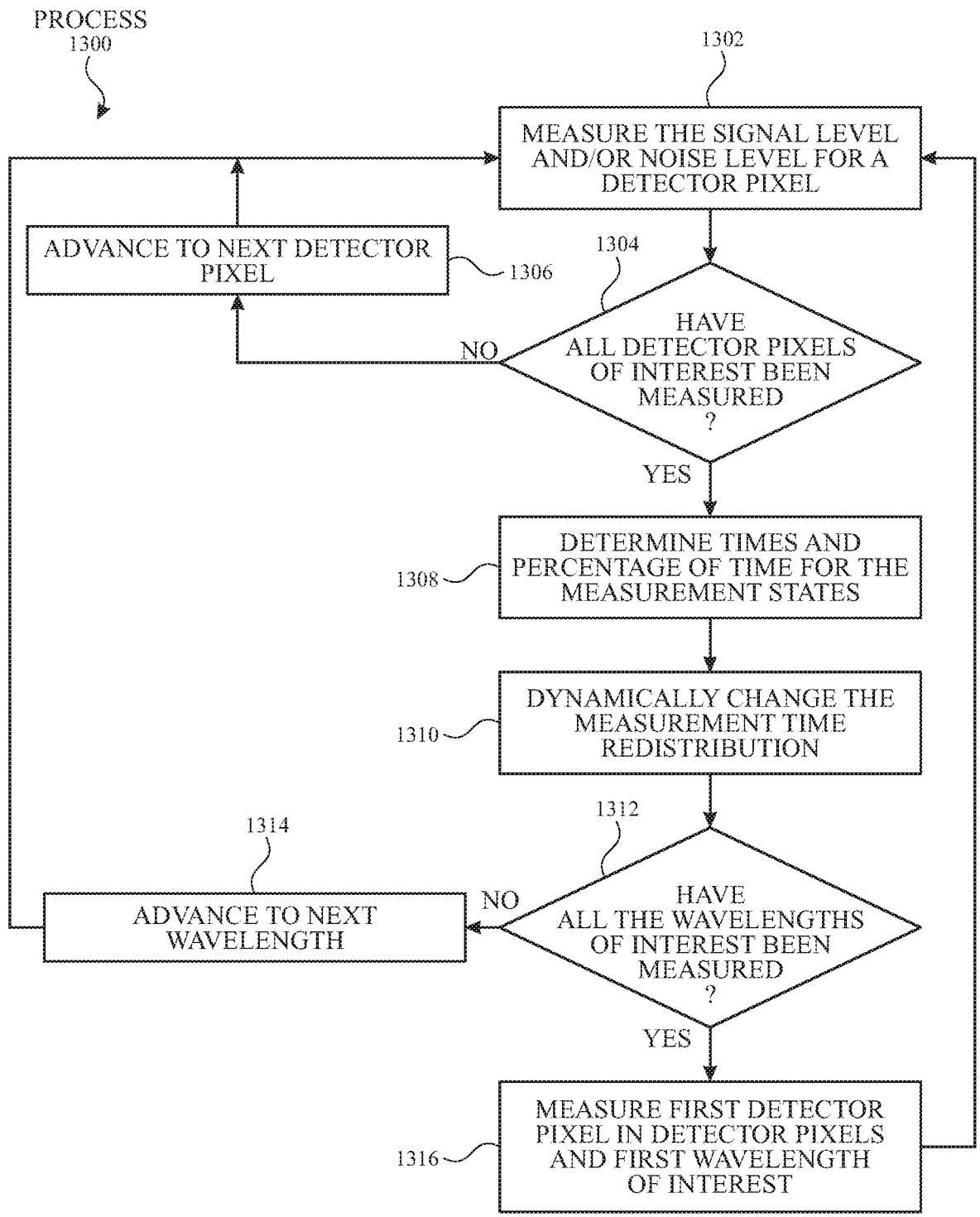
FIG. 13 illustrates an exemplary process flow for dynamically changing the measurement time distribution according to examples of the disclosure.

FIG. 13 illustrates an exemplary process flow for dynamically changing the measurement time distribution according to examples of the disclosure. Process 1300 can include measuring the signal value for a detector pixel, noise levels, or both at a given wavelength (step 1302). In some examples, the measurement can be a coarse measurement performed for a pre-determined time. The measurement can be repeated for other detector pixels included in the system (step 1304 and step 1306). Based on the measured signal value and noise levels, a controller or processor included in the system can determine the times and percentages for each of the plurality of measurement states using the LUT (step 1308). In some examples, the LUT can include targeted or pre-determined SNR, which can be used for determining the times and percentages for the measurement states. Using the determined times and percentages, the system can dynamically change the measurement time distribution (step 1310). In some examples, the system can include logic that provides feedback regarding the overall measurement time, measurement accuracy, and actual SNR, and based on any deviation from the targeted values, the system can rewrite or update the LUT. The measurement can be repeated for other wavelengths of interest (step 1312 and step 1314). When all detector pixels of interest and wavelengths of interest are measured, the system can repeat the measurements (step 1316).

Figure 14:
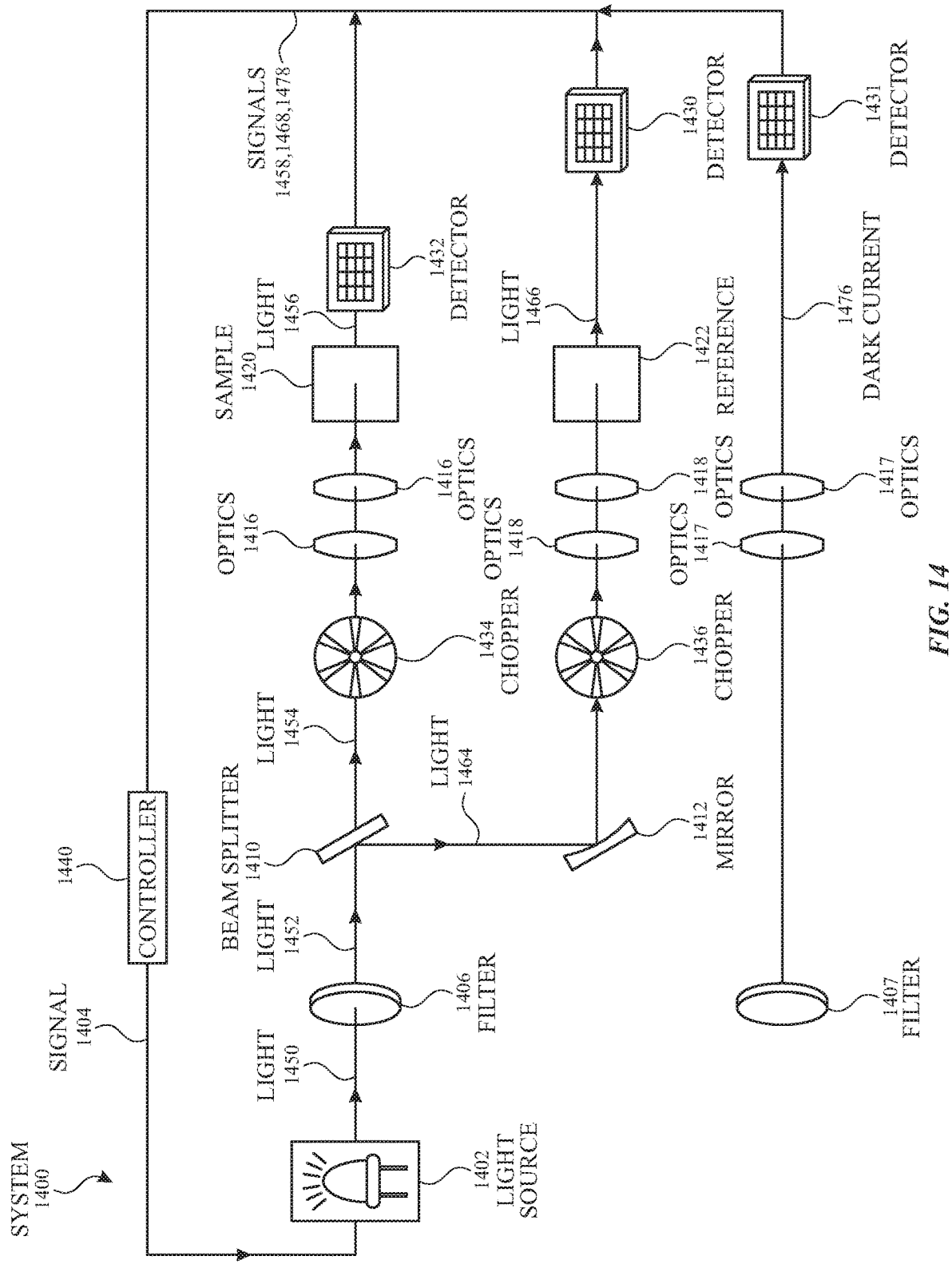
FIG. 14 illustrates a portion of an exemplary system for measuring the concentration and type of one or more substances in a sample and capable of measuring different measurement states concurrently according to examples of the disclosure.

In some examples, different measurement states can be measured concurrently. FIG. 14 illustrates a portion of an exemplary system for measuring the concentration and type of one or more substances in a sample and capable of measuring different measurement states concurrently according to examples of the disclosure. System 1400 can include several components, such as light source 1402, controller 1440, filter 1406, filter 1407, beamsplitter 1410, mirror 1412, chopper 1434, chopper 1436, optics 1416, optics 1417, and optics 1418, that have one or more of the properties as discussed above in the context of system 100 (illustrated in FIG. 1), system 300 (illustrated in FIG. 3), system 600 (illustrated in FIG. 6), and system 800 (illustrated in FIG. 8). System 1400 can further include a plurality of detectors, such as detector 1430, detector 1431, and detector 1432. Detector 1430 can be configured to measure the reference signal during the reference measurement state (e.g., reference measurement state 1184 or reference measurement state 1284) and can generate signal 1468 indicative of the properties of light 1466 through reference 1422. Detector 1431 can be configured to measure noise (e.g., dark current) during the dark measurement state (e.g., dark measurement state 1186 or dark measurement state 1286) and can generate signal 1478 indicative of the properties of dark current 1476. Detector 1432 can be configured to measure the sample signal during the sample measurement state (e.g., sample measurement state 1182 or sample measurement state 1282) and can generate signal 1458 indicative of the properties of light 1456 through sample 1420. In this manner, the plurality of detectors can be used to measure the sample signal, reference signal, and noise signal concurrently. During one cycle, the system can generate a plurality of reference measurements values, and at least one detector pixel can be measuring a signal (e.g., sample signal, reference signal, or noise signal) at all times.

Figure 15:
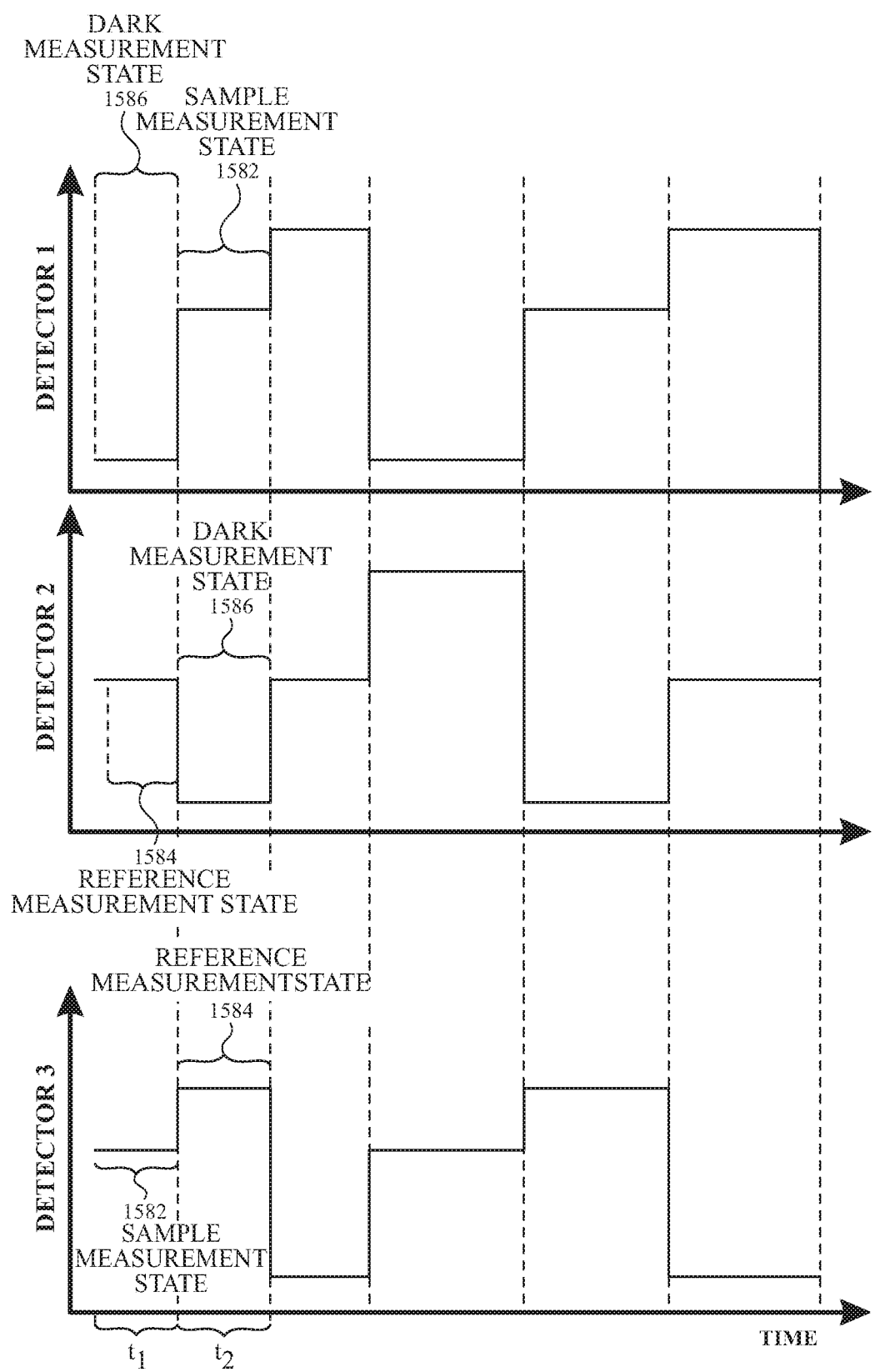
FIG. 15 illustrates an exemplary plot of measurement states for a system capable of measuring different measurement states concurrently according to examples of the disclosure.

FIG. 15 illustrates an exemplary plot of measurement states for a system capable of measuring different measurement states concurrently according to examples of the disclosure. The system can include three detectors: detector 1, detector 2, and detector 3, and can be configured with three measurement states: sample measurement state 1582, reference measurement state 1584, and dark measurement state 1586. During time $t_1$, detector 1 can be configured to measure the noise signal in dark measurement state 1586. At the same time, detector 2 can be configured to measure the reference signal in reference measurement state 1584, and detector 3 can be configured to measure the sample signal in sample measurement state 1582. At another time $t_2$, the measurement states for each detector can change. Detector 1 can be configured to measure the sample signal in sample measurement state 1582, detector 2 can be configured to measure noise signal in dark measurement state 1586, and detector 3 can be configured to measure the reference signal in reference measurement state 1584. As illustrated in the figures, each detector (e.g., detector 1, detector 2, and detector 3) can measure one of the three signal values at all times. That is, the measurement states can be measured concurrently across different detectors, and consecutively at each detector. In some examples, the system can include a tunable mirror configured to direct or redirect the light to different detectors. In some examples, the tunable mirror can include a plurality of data light processing (DLP) mirrors. In some examples, light can be redirected using one or more beamsplitters.

Figure 16:
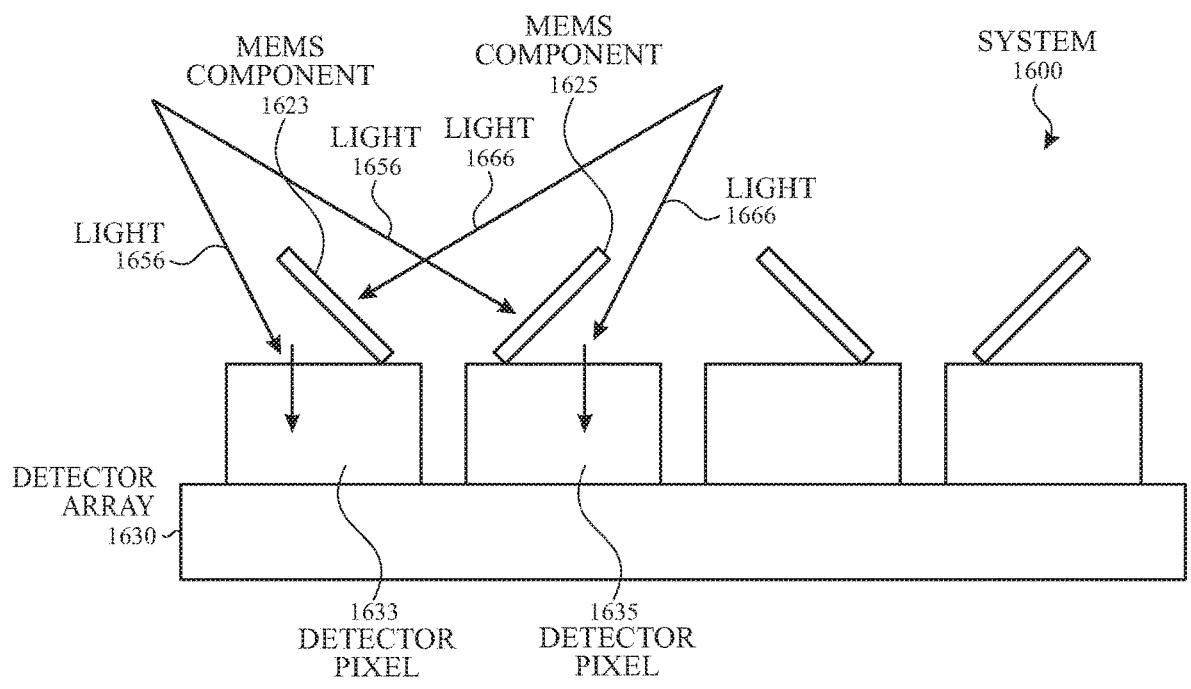
FIG. 16 illustrates a cross-sectional view of a portion of an exemplary system including a plurality of MEMS components and capable of measuring different measurement states concurrently according to examples of the disclosure.

In some examples, the system can include a plurality of microelectromechanical systems (MEMS) components. FIG. 16 illustrates a cross-sectional view of a portion of an exemplary system including a plurality of MEMS components and capable of measuring different measurement states concurrently according to examples of the disclosure. System 1600 can include a plurality of detector pixels, such as detector pixel 1633 and detector pixel 1635, included in detector array 1630 and a plurality of MEMS components, such as MEMS component 1623 and MEMS component 1625. Each detector pixel can be coupled to a MEMS component. For example, detector pixel 1633 can be coupled to MEMS component 1623, and detector pixel 1635 can be coupled to MEMS component 1625. Light 1656 can be light reflected off the sample, and MEMS component 1623 can be angled or oriented such that light 1656 is incident on detector pixel 1633. Additionally, light 1666, which can be light reflected off the reference, can be blocked by MEMS component 1623. MEMS component 1625 can be angled or oriented such that light 1666 is incident on detector pixel 1637, and light 1656 (i.e., light reflected off the sample) can be blocked and prevented from reaching detector pixel 1635. In some examples, the MEMS component can change orientations during different times to measure light from the sample at one time and then measure light from the reference at another time. In some examples, one or more adjacent detector pixels or adjacent sets of detector pixels in the detector array 1630 can have MEMS components with different orientations.

Figure 17:
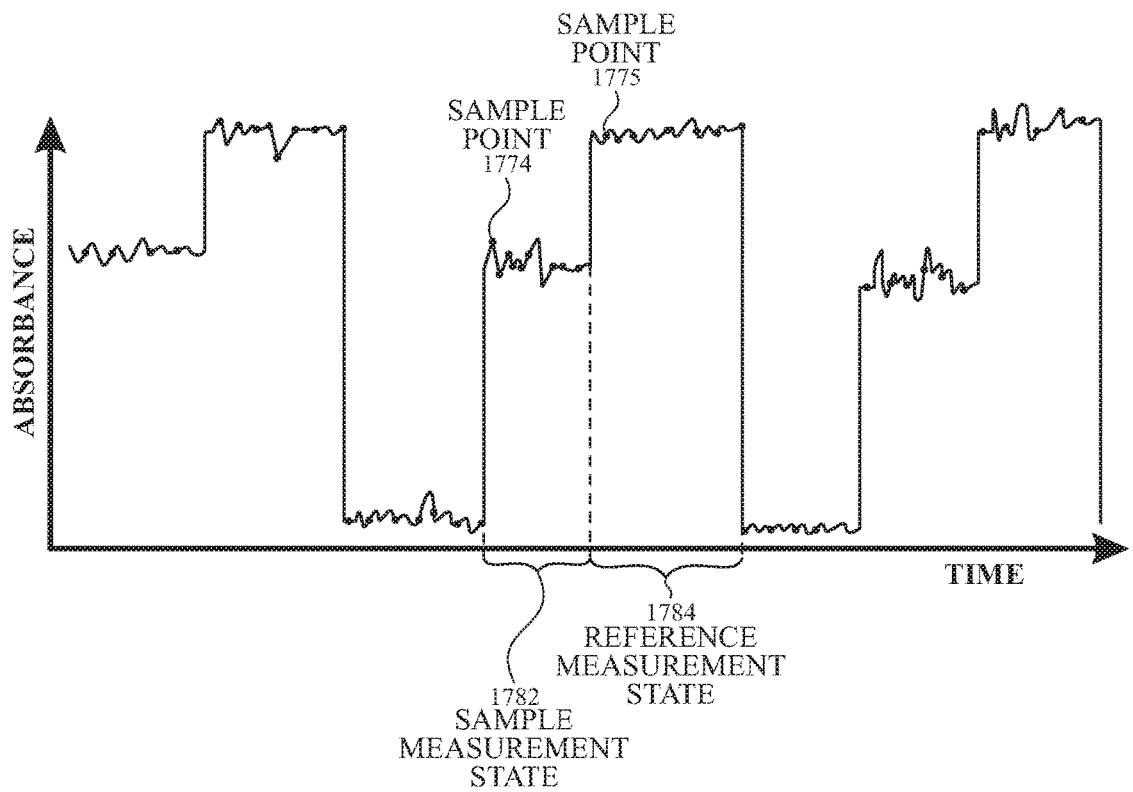
FIG. 17 illustrates an exemplary plot of absorbance measurements with noise fluctuations according to examples of the disclosure.

In some examples, the noise levels can lead to fluctuations that can be decorrelated in time. FIG. 17 illustrates an exemplary plot of absorbance measurements with noise fluctuations according to examples of the disclosure. The measurement can include a plurality of sample points, such as sample point 1774 and sample point 1775. Sample point 1774 can be included in sample measurement state 1782, and sample point 1775 can be included in reference measurement state 1784. Noise included in sample point 1774 can be different from noise included in sample point 1775, which can lead to time decorrelated noise in the sample signal and the reference signal. Decorrelated noise in the sample signal and the reference signal can lead to erroneous measurements.

Noise common to both the sample signal and reference signal can be referred to as common mode noise. In some examples, common mode noise can originate from the light sources included in the system, as well as other components in the system that can be used to route, attenuate, and/or shape the light beam emitted from the light sources. The light sources can include multiple types of noise, such as long-term drift and short-term noise. The decorrelated noise referred to earlier can be short-term noise, which can be high frequency noise.

Figure 18:
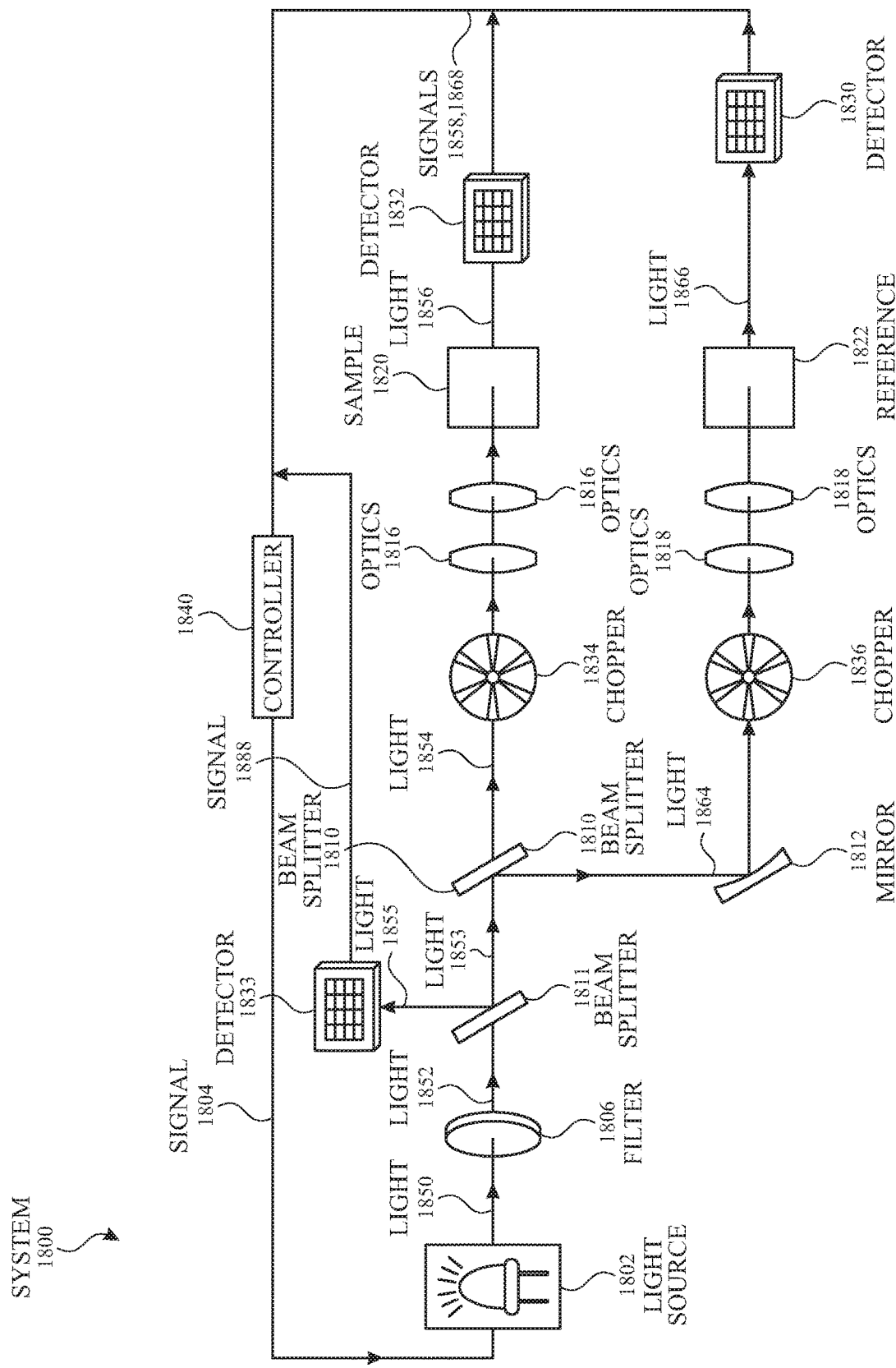
FIG. 18 illustrates an exemplary system for measuring the concentration and type of one or more substances in a sample including a high-frequency detector according to examples of the disclosure.
Figure 19:
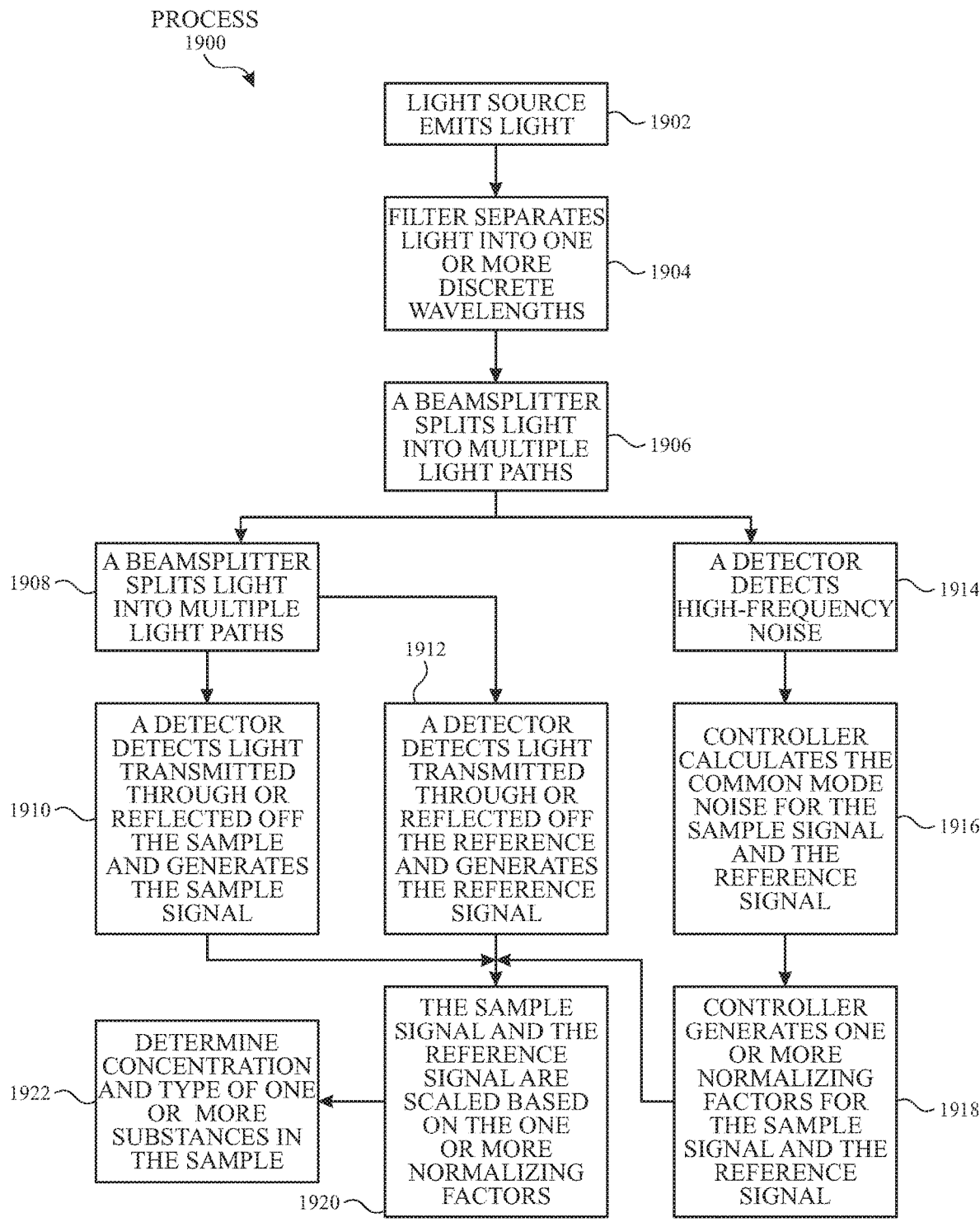
FIG. 19 illustrates an exemplary process flow for measuring the concentration and type of one or more substances in a sample using a system including a high-frequency detector according to examples of the disclosure.

FIG. 18 illustrates an exemplary system and FIG. 19 illustrates an exemplary process flow for measuring the concentration and type of one or more substances in a sample including a high-frequency detector according to examples of the disclosure. System 1800 can include several components, such as light source 1802, controller 1840, filter 1806, beamsplitter 1810, mirror 1812, chopper 1834, chopper 1836, optics 1816, optics 1818, detector 1830, and detector 1832, that have one or more of the properties discussed above in the context of system 100 (illustrated in FIG. 1), system 300 (illustrated in FIG. 3), system 600 (illustrated in FIG. 5), system 800 (illustrated in FIG. 8), and system 1400 (illustrated in FIG. 14). System 1800 can further include beamsplitter 1811 and detector 1833. Beamsplitter 1811 can be an optical component configured to split incident light into multiple light beams. One or more of these hardware components can operate under the software control of controller 1840 to change the measurement cycles and states described herein. One or more of these hardware components and the controller can be referred to herein as logic.

Light source 1802 can be directed towards filter 1806, and signal 1804 can cause light source 1802 to emit light 1850 (step 1902 of process 1900). Light 1850 can comprise multiple wavelengths, can be transmitted through filter 1806, and can form light 1852 comprising one or more discrete wavelengths (step 1904 of process 1900). Light 1852 can be directed towards beamsplitter 1811, and beamsplitter 1811 can split light 1852 into two light paths: light 1853 and light 1855 (step 1906 of process 1900).

Light 1853 can be directed towards beamsplitter 1810, and beamsplitter 1811 can split light 1853 into two light beams: light 1854 and light 1864 (step 1908 of process 1900). Light 1854 can be transmitted through chopper 1834 and optics 1816. Light 1854 can be incident on sample 1820 and one or more substances in sample 1820 can absorb at least a portion of light 1854. Light that is transmitted through or reflects off sample 1820 can be referred to as light 1856. Detector 1832 can detect light 1856 and can generate signal 1858 indicative of the properties of light 1856 (step 1910 of process 1900). Additionally, light 1864 can be directed or redirected by mirror 1812 and can be transmitted through chopper 1836 and optics 1818. Light 1864 can be incident on reference 1822 and a portion can be transmitted through or reflect off reference 1822 as light 1866. Detector 1830 can detect light 1866 and can generate signal 1868 indicative of the properties of light 1866 (step 1912 of process 1900). In some examples, detector 1830 and detector 1832 can measure the reference signal and the sample signal, respectively, at the same time or concurrently. In some examples, detector 1830 and detector 1832 can measure the reference signal and sample signal at different times. In some examples, system 1800 can be configured such that a single detector measures both the sample signal and the reference signal.

Detector 1833 can be configured to measure light 1853 and can generate signal 1888 indicative of the properties of light 1855 (step 1914 of process 1900). In some examples, detector 1833 can be a high-frequency detector that can be AC coupled to measure high-frequency noise. Controller 1840 can receive signal 1888 and can calculate the common mode noise for each of the signals (e.g., sample signal and reference signal) in time (step 1916 of process 1900). Based on the calculated common mode noise, controller 1840 can generate one or more normalizing factors for each of the signals (step 1918 of process 1900). In some examples, the normalizing factors can be generated based on matching the noise intensity of signal 1888 with signal 1858 and/or signal 1868. In some examples, matching the noise intensity of signal 1888 with signal 1858 and/or signal 1868 can include reducing differences in intensity values of the signals. The sample signal and reference signal can be corrected or scaled based on the normalizing factors or a scaling scheme (step 1920 of process 1900). In some examples, the normalizing factors or scaling scheme can be based on a standard deviation. The corrected or scaled signals are then used to determine the concentration and type of the one or more substances in the sample (step 1922 of process 1900).

By detecting the high-frequency noise included in light 1852 with detector 1833, the sample signal noise can be reduced and SNR can be improved. In some examples, detector 1833 can be configured with a different gain than detector 1830, detector 1832, or both. In some examples, beamsplitter 1811 can split light 1852 such that light 1853 and light 1855 have different intensities.

One or more of the functions described above can be performed, for example, by firmware stored in memory and executed by a processor or controller. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as a CD, CD-R, CD-RW, DVD, DVD-R, or DVD-RW, or flash memory such as compact flash cards, secured digital cards, USB memory devices, memory sticks and the like. In the context of this document, a "transport medium" can be any medium that can communicate, propagate, or transport the program for use by or in connection with the instruction execution system, apparatus, or device. The transport readable medium can include, but is not limited to, an electronic, magnetic, optical, electromagnetic, or infrared wired or wireless propagation medium.

As discussed above, examples of the disclosure can include measuring a concentration of a substance in a sample at a sampling interface. In some examples, the sample can include at a least a portion of a user, where additional information can be used to improve the delivery of measured information, analysis, or any other content that may be of interest to the users. In some examples, the measured information, analysis, or other content may include personal information such as information that can uniquely identify the user (e.g., can be used to contact or locate the user). In some examples, personal information can include geographic information, demographic information, telephone numbers, email addresses, mailing addresses, home addresses, or other identifying information. Use of such personal information can be used to the benefit of the user. For example, the personal information can be used to deliver the measured information, analysis, or other content to the user. Use of personal information can include, but is not limited to, enabling timely and controlled delivery of the measured information.

The disclosure also contemplates that an entity that may be measuring, collecting, analyzing, disclosing, transferring, and/or storing the personal information will comply with well-established privacy policies and/or practices. These privacy policies and/or practices can be generally recognized as meeting (or exceeding) industry or governmental requirements for private and secure personal information and should be implemented and consistently used. For example, personal information should be collected for legitimate and reasonable purposes (e.g., to deliver the measured information to the user) and should not be shared (e.g., sold) outside of those purposes. Furthermore, collected personal information should occur only after receiving the informed consent of the user(s). To adhere to privacy policies and/or practices, entities should take any steps necessary for safeguarding and securing outside access to the personal information. In some examples, entities can subject themselves to third party evaluation(s) to certify that the entities are adhering to the well-established, generally recognized privacy policies and/or practices.

In some examples, the user(s) can selectively block or restrict access to and/or use of the personal information. The measurement system can include one or more hardware components and/or one or more software applications to allow the user(s) to selective block or restrict access to and/or use of the personal information. For example, the measuring system can be configured to allow users to "opt in" or "opt out" of advertisement delivery services when collecting personal information during registration. In some examples, a user can select which information (e.g., geographical location) to provide and which information (e.g., phone number) to exclude.

Although examples of the disclosure can include systems and method for measuring a concentration of a substance with the use of the user's personal information, examples of the disclosure can also be capable of one or more functionalities and operation without the user's personal information. Lack of all or a portion of the personal information may not render the systems and methods inoperable. In some examples, content can be selected and/or delivered to the user based on non-user specific personal (e.g., publicly available) information.

A system for determining a concentration and type of substance in a sample at a sampling interface is disclosed. In some examples, the system comprises: one or more detector pixels including a first detector pixel, wherein the one or more detector pixels are configured to operate in a plurality of cycles, each cycle including a plurality of measurement states, the plurality of measurement states including: a first measurement state configured to measure one or more optical properties of the substance during a first time period, a second measurement state configured to measure one or more optical properties of a reference during a second time period, and a third measurement state configured to measure noise during a third time period; and logic capable of dynamically changing one or more aspects of the plurality of cycles, wherein the one or more aspects include a duration of a respective time period. Additionally or alternatively, in some examples, the one or more detector pixels further includes a second detector pixel, the first detector pixel configured into the first measurement state, and the second detector pixel configured into the second measurement state at a same time. Additionally or alternatively, in some examples, the one or more detector pixels further includes a third detector pixel, the third detector pixel configured into the third measurement state at the same time. Additionally or alternatively, in some examples, the system further comprises: a plurality of mirrors, each mirror associated with a detector pixel included in the plurality of detector pixels and configured with an orientation such that a first light is reflected or blocked, and further configured to provide the associated detector pixel access to a second light, different from the first light. Additionally or alternatively, in some examples, the system further comprises: a detector pixel configured into the first measurement state, second measurement state, and third measurement state, wherein the first, second, and third measurement states are consecutive and determination of the concentration and type of substance is based on the first, second, and third measurement states.

A method of determining a concentration and type of substance in a sample at a sampling interface during a plurality of cycles, the plurality of cycles including a first cycle and a second cycle, is disclosed. In some examples, the method comprises: during the first cycle: measuring one or more optical properties of the substance during a first time period; measuring one or more optical properties of a reference z: a second time period; measuring noise during a third time period; and dynamically changing a duration of at least one of the first time period, second time period, and third time period during the second cycle. Additionally or alternatively, in some examples, the duration of at least two of the first time period, second time period, and third time period within the first cycle are different. Additionally or alternatively, in some examples, measuring one or more optical properties of the substance includes obtaining a first signal value and measuring one or more optical properties of the reference includes obtaining a second signal value, the method further comprising: comparing the first signal value to the second signal value; and setting the first time period greater than the second time period when the first signal value is less than the second signal value. Additionally or alternatively, in some examples, the first time period is set greater than 50% of a time period for the first cycle. Additionally or alternatively, in some examples, measuring one or more optical properties of the substance includes obtaining a first signal value and measuring one or more optical properties of the reference includes obtaining a second signal value, the method further comprising: comparing the first signal value to the second signal value; and setting the first time period less than the second time period when the first signal value is greater than the second signal value. Additionally or alternatively, in some examples, the second time period is set greater than 50% of a time period for the first cycle. Additionally or alternatively, in some examples, the first cycle includes a first operating wavelength and the second cycle includes a second operating wavelength, the first operating wavelength different from the second operating wavelength, and the first cycle having at least one of the first time period, second time period, and third time period different from the second cycle. Additionally or alternatively, in some examples, the first time period is the same as the second time period within the first cycle. Additionally or alternatively, in some examples, each cycle included in the plurality of cycles is associated with a detector pixel included in a plurality of detector pixels, the method further comprising: retrieving one or more entries from a look-up table, the one or more entries including an association between the first time period, second time period, and third time period and at least one of an operating wavelength and the detector pixel; and setting at least one of the first time period, second time period, and third time period based on the one or more entries. Additionally or alternatively, in some examples, at least one of the first time period, second time period, and third time period are different for at least two detector pixels included in the plurality of detector pixels. Additionally or alternatively, in some examples, the method further comprises: determining a property associated with the operating wavelength and the detector pixel, the property being at least one of a measurement time, measurement accuracy, and signal-to-noise ratio (SNR); comparing the property to the one or more entries from the look-up table; and updating the one or more entries from the look-up table based on the comparison. Additionally or alternatively, in some examples, the plurality of cycles further includes a third cycle, and further wherein the first time period for the first cycle is same as the second time period for the second cycle and the third time period for the third cycle.

A system for determining a concentration and type of substance in sample at a sampling interface is disclosed. In some examples, the system comprises: a light source configured to emit a first light and a second light, the first light incident on the sampling interface and the second light incident on a reference, wherein the first light and the second light include a noise component; a first detector configured to measure incident light, the incident light being at least one of the first light and the second light, and configured to generate a first signal indicative of the incident light; a second detector configured to measure the noise component included in a range of frequencies, and configured to generate a second signal indicative of the measured noise component; and logic capable of scaling the second signal and compensating the first signal using the scaled second signal. Additionally or alternatively, in some examples, a gain of the first detector is different from a gain of the second detector. Additionally or alternatively, in some examples, an intensity of the first light is different from an intensity of the second light.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A system for determining a concentration and a type of substance in a sample at a sampling interface, the system comprising:
   one or more detector pixels including a first detector pixel, wherein the one or more detector pixels are configured to operate in a plurality of cycles, each cycle including a plurality of measurement states, the plurality of measurement states including:
      a first measurement state configured to measure one or more optical properties of the type of substance in the sample during a first time period,
      a second measurement state configured to measure one or more optical properties of a reference during a second time period, and
      a third measurement state configured to measure noise during a third time period; and
   logic capable of dynamically changing one or more aspects of the plurality of cycles, wherein the one or more aspects include a duration of a respective time period.

2. The system of claim 1, wherein the one or more detector pixels further includes a second detector pixel, the first detector pixel configured into the first measurement state, and the second detector pixel configured into the second measurement state at a same time.

3. The system of claim 2, wherein the one or more detector pixels further includes a third detector pixel, the third detector pixel configured into the third measurement state at the same time.

4. The system of claim 2, further comprising:
   a plurality of mirrors, each mirror associated with a detector pixel included in the one or more detector pixels and configured with an orientation such that a first light is reflected or blocked, and further configured to provide the associated detector pixel access to a second light, different from the first light.

5. The system of claim 1, further comprising:
   a detector pixel configured into the first measurement state, second measurement state, and third measurement state, wherein the first, second, and third measurement states are consecutive and determination of the concentration and the type of substance is based on the first, second, and third measurement states.

6. A method of determining a concentration and a type of substance in a sample at a sampling interface during a plurality of cycles, the plurality of cycles including a first cycle and a second cycle, the method comprising:
   during the first cycle:
      measuring one or more optical properties of the type of substance in the sampling interface during a first time period;
      measuring one or more optical properties of a reference during a second time period;
      measuring noise during a third time period; and
   dynamically changing a duration of at least one of the first time period, second time period, and third time period during the second cycle.

7. The method of claim 6, wherein the duration of at least two of the first time period, second time period, and third time period within the first cycle are different.

8. The method of claim 6, wherein measuring one or more optical properties of the substance includes obtaining a first signal value and measuring one or more optical properties of the reference includes obtaining a second signal value, the method further comprising:
   comparing the first signal value to the second signal value; and
   setting the first time period greater than the second time period when the first signal value is less than the second signal value.

9. The method of claim 8, wherein the duration of the first time period is set greater than 50% of a duration of the first cycle.

10. The method of claim 6, wherein measuring one or more optical properties of the substance includes obtaining a first signal value and measuring one or more optical properties of the reference includes obtaining a second signal value, the method further comprising:
    comparing the first signal value to the second signal value; and
    setting the first time period less than the second time period when the first signal value is greater than the second signal value.

11. The method of claim 10, wherein the duration of the second time period is set greater than 50% of a duration of the first cycle.

12. The method of claim 6, wherein the first cycle includes a first operating wavelength and the second cycle includes a second operating wavelength, the first operating wavelength different from the second operating wavelength, and the first cycle having at least one of the first time period, second time period, and third time period different from the second cycle.

13. The method of claim 6, wherein the duration of the first time period is the same as the duration of the second time period within the first cycle.

14. The method of claim 6, wherein each cycle included in the plurality of cycles is associated with a detector pixel included in a plurality of detector pixels, the method further comprising:
    retrieving one or more entries from a look-up table, the one or more entries including an association between the first time period, second time period, and third time period and at least one of an operating wavelength and the detector pixel; and
    setting at least one of the first time period, second time period, and third time period based on the one or more entries.

15. The method of claim 14, wherein at least one of the first time period, second time period, and third time period are different for at least two detector pixels included in the plurality of detector pixels.

16. The method of claim 14, further comprising:
    determining a property associated with the operating wavelength and the detector pixel, the property being at least one of a measurement time, measurement accuracy, and signal-to-noise ratio (SNR);
    comparing the property to the one or more entries from the look-up table; and
    updating the one or more entries from the look-up table based on the comparison.

17. The method of claim 6, wherein the plurality of cycles further includes a third cycle, and further wherein a duration of the first time period for the first cycle is same as a duration of second time period for the second cycle and a duration of the third time period for the third cycle.

18. A system for determining a concentration and type of substance in a sample site including a sampling interface, the system comprising:
- a light source configured to emit a first light and a second light, the first light incident on the sampling interface and the second light incident on a reference, wherein the first light and the second light include a noise component;
- a first detector configured to measure incident light, the incident light being at least one of the first light and the second light, and configured to generate a first signal indicative of the incident light;
- a second detector configured to measure the noise component included in a range of frequencies, and configured to generate a second signal indicative of the measured noise component; and
- logic capable of scaling the second signal and compensating the first signal using the scaled second signal.

19. The system of claim 18, wherein a gain of the first detector is different from a gain of the second detector.

20. The system of claim 19, wherein an intensity of the first light is different from an intensity of the second light.

* * * * *